United States Patent
Droz et al.

(10) Patent No.: US 10,578,724 B2
(45) Date of Patent: *Mar. 3, 2020

(54) LIDAR OPTICS ALIGNMENT SYSTEMS AND METHODS

(71) Applicant: Waymo LLC, Mountain View, CA (US)

(72) Inventors: Pierre-Yves Droz, Los Altos, CA (US); David Neil Hutchison, Santa Clara, CA (US); Luke Wachter, San Francisco, CA (US); Alexander McCauley, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,864

(22) Filed: Apr. 10, 2019

(65) Prior Publication Data

US 2019/0235064 A1    Aug. 1, 2019

Related U.S. Application Data

(63) Continuation of application No. 16/120,361, filed on Sep. 3, 2018, now Pat. No. 10,302,749, which is a (Continued)

(51) Int. Cl.
*G01S 17/42* (2006.01)
*G01S 7/497* (2006.01)
(Continued)

(52) U.S. Cl.
CPC .......... *G01S 7/4972* (2013.01); *G01S 17/023* (2013.01); *G01S 17/42* (2013.01); *G01S 17/89* (2013.01)

(58) Field of Classification Search
CPC .......... G01S 17/89; G01S 13/89; G01S 17/42; G01S 7/4972; G01S 17/023;
(Continued)

(56) References Cited

U.S. PATENT DOCUMENTS

| 7,697,748 B2 | 4/2010 | Dimsdale et al. |
| 8,020,307 B2 | 9/2011 | Schwindt |

(Continued)

FOREIGN PATENT DOCUMENTS

| JP | 2007163258 A1 | 6/2007 |
| JP | 2007218738 A1 | 8/2007 |

OTHER PUBLICATIONS

International Search Report and Written Opinion for PCT/US2018/033773, dated Sep. 13, 2018.

*Primary Examiner* — Michael P Stafira
(74) *Attorney, Agent, or Firm* — McDonnell Boehnen Hulbert & Berghoff LLP

(57) ABSTRACT

One example method involves obtaining a plurality of images using a camera located at a given position relative to a light detection and ranging (LIDAR) device. A first image of the plurality may be obtained while a first aperture is interposed between the camera and the LIDAR device. A second image of the plurality may be obtained while a second aperture is interposed between the camera and the LIDAR device. The method also involves determining one or more alignment offsets between a transmitter of the LIDAR device and a receiver of the LIDAR device based on the plurality of images.

20 Claims, 16 Drawing Sheets

Related U.S. Application Data continuation of application No. 15/618,133, filed on Jun. 9, 2017, now Pat. No. 10,094,916.

(51) Int. Cl.
*G01S 17/89* (2020.01)
*G01S 17/02* (2020.01)

(58) Field of Classification Search
CPC ...... G01S 13/865; G01S 13/867; G01S 13/86; G01S 13/9307; G01S 15/025; G01S 15/89; G01S 7/20; G01S 17/003; G01S 17/06; G01S 17/58; G01S 17/95; G01S 19/07; G01S 19/40; G01S 19/47; G01S 19/48; G01S 19/49; G01S 3/784; G01S 3/786; G01S 7/4815; G01S 7/4817; G01S 7/51; G01B 7/31; G02B 27/62; G02B 5/20

See application file for complete search history.

(56) References Cited

U.S. PATENT DOCUMENTS

| | | |
|---|---|---|
| 8,768,007 B2 | 7/2014 | Schamp |
| 8,836,922 B1 | 9/2014 | Pennecot et al. |
| 9,041,915 B2 | 5/2015 | Earhart et al. |
| 9,910,139 B2 | 3/2018 | Pennecot et al. |
| 2013/0251194 A1 | 9/2013 | Schamp |
| 2014/0049765 A1 | 2/2014 | Zheleznyak et al. |
| 2015/0062555 A1 | 3/2015 | Kim |
| 2016/0103224 A1 | 4/2016 | Stettner et al. |
| 2016/0227193 A1 | 8/2016 | Osterwood et al. |
| 2016/0282453 A1* | 9/2016 | Pennecot ............ G01S 7/4972 |

* cited by examiner

LIDAR OPTICS ALIGNMENT SYSTEMS AND METHODS

CROSS-REFERENCE TO RELATED APPLICATIONS

This application is a continuation of U.S. patent application Ser. No. 16/120,361 filed Sep. 3, 2018, which is a continuation of U.S. patent application Ser. No. 15/618,133 filed Jun. 9, 2017. These applications are incorporated herein by reference in their entirety.

BACKGROUND

Unless otherwise indicated herein, the materials described in this section are not prior art to the claims in this application and are not admitted to be prior art by inclusion in this section.

A LIDAR can estimate distances to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmission of the transmitted pulse and the reception of the reflected pulse. A laser, or set of lasers, can be rapidly and repeatedly scanned across a scene to provide continuous real-time information on distances to objects in the scene. Combining the measured distances and the orientation of the laser(s) while measuring each distance allows for associating a three-dimensional position with each returning pulse. In this way, a three-dimensional map of points indicative of locations of reflective features in the environment can be generated for a scanning zone.

SUMMARY

In one example, a method involves obtaining a plurality of images using a camera located at a given position relative to a light detection and ranging (LIDAR) device. The LIDAR device may include a transmitter comprising one or more light sources and a receiver comprising one or more light detectors. Obtaining the plurality of images may involve obtaining a first image while a first aperture is interposed between the camera and the LIDAR device at a first position relative to the camera. Obtaining the plurality of images may also involve obtaining a second image while a second aperture is interposed between the camera and the LIDAR device at a second position relative to the camera. The method also involves determining one or more alignment offsets between the transmitter and the receiver based on the plurality of images.

In another example, a system includes a platform that supports a light detection and ranging (LIDAR) device that includes a transmitter and a receiver. The transmitter may include one or more light sources. The receiver may include one or more light detectors. The system also includes a camera located at a given position relative to the LIDAR device. The system also includes a controller that obtains a plurality of images using the camera. Obtaining the plurality of images may involve obtaining a first image while a first aperture is interposed between the camera and the LIDAR device at a first position relative to the camera. Obtaining the plurality of images may also involve obtaining a second image while a second aperture is interposed between the camera and the LIDAR device at a second position relative to the camera. The controller also determines one or more alignment offsets between the transmitter and the receiver based on the plurality of images.

In yet another example, a system includes a means for obtaining a plurality of images using a camera located at a given position relative to a light detection and ranging (LIDAR) device. The LIDAR device may include a transmitter comprising one or more light sources and a receiver comprising one or more light detectors. Obtaining the plurality of images may involve obtaining a first image while a first aperture is interposed between the camera and the LIDAR device at a first position relative to the camera. Obtaining the plurality of images may also involve obtaining a second image while a second aperture is interposed between the camera and the LIDAR device at a second position relative to the camera. The system also includes a means for determining one or more alignment offsets between the transmitter and the receiver based on the plurality of images.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations.

Within examples, a LIDAR device may include a transmitter and a receiver. The transmitter may include one or more light sources that transmit light for propagation away from the LIDAR device toward an environment of the LIDAR device. In turn, the transmitted light may reflect off one or more objects in the environment, and the reflected light may propagate back toward the LIDAR device. Further, the receiver may include one or more detectors to detect the reflected light. Through this process, a computing system may process data from the LIDAR device pertaining to the reflected light to determine positions and/or characteristics of various objects in the environment of the LIDAR device.

To facilitate operation of the LIDAR device, a light beam emitted by a given light source and reflected back toward the LIDAR device is received by a corresponding detector. Within examples, systems and methods are provided for alignment of light source(s) and detector(s) in a LIDAR device.

I. Example LIDAR devices

Example LIDAR devices will now be described in greater detail. It is noted that the various LIDAR Optics Alignment systems, devices, and methods of the present disclosure can be employed with various types of LIDAR devices having various numbers of light sources and detectors, and/or implemented using various geometries among other possibilities. Thus, the example LIDAR device implementations illustrated herein are only for the sake of example. Other LIDAR device structures and arrangements are possible as well.

Figure 1A:
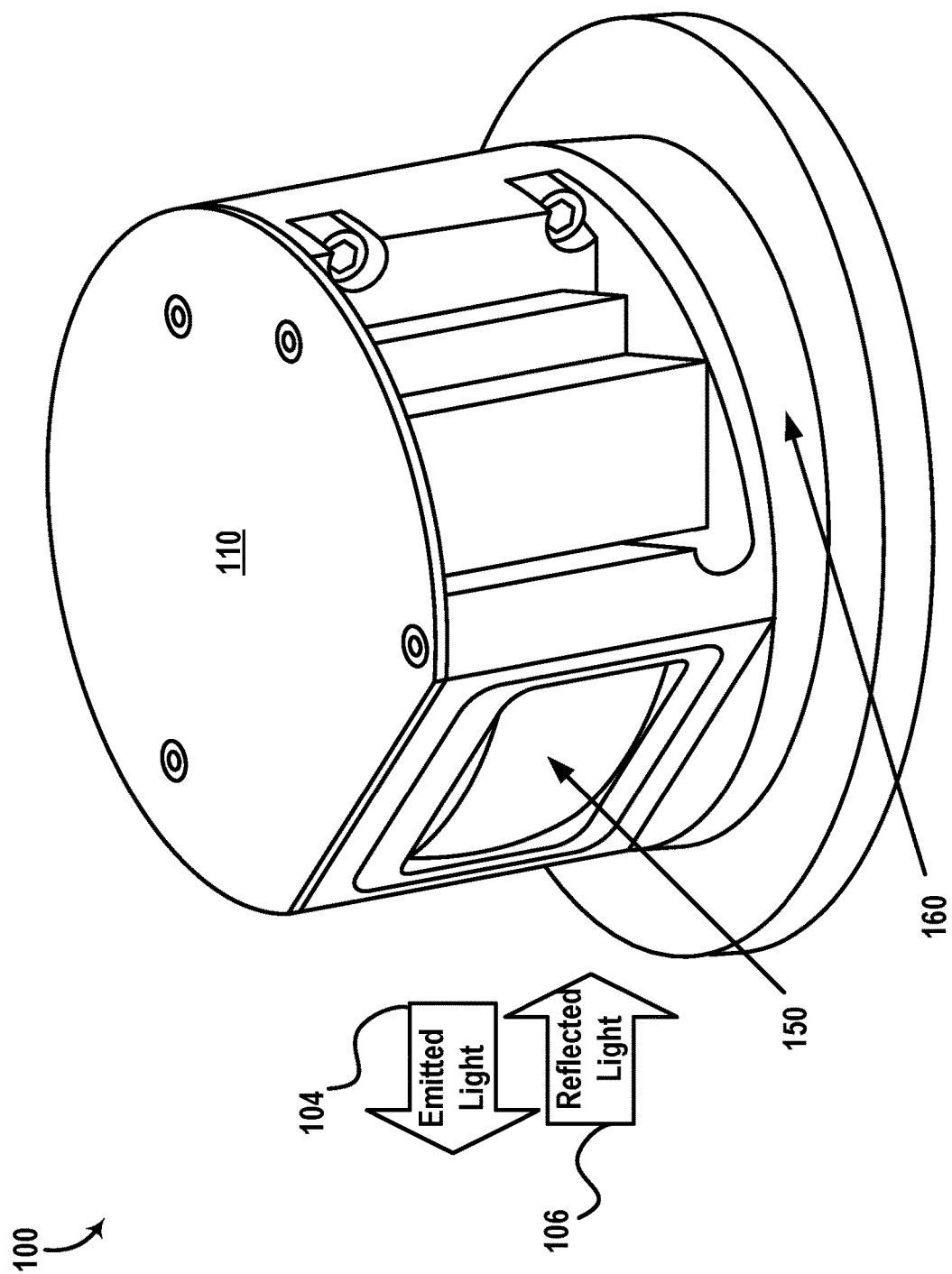
FIG. 1A illustrates a LIDAR device, according to an example embodiment.

FIG. 1A illustrates a LIDAR device 100, according to an example embodiment. As shown, the LIDAR device 100 includes a housing 110 and a lens 150. Additionally, light beams 104 emitted by the LIDAR device 100 propagate from the lens 150 along a viewing direction of the first LIDAR 100 toward an environment of the LIDAR device 100, and reflect off one or more objects in the environment as reflected light 106.

The housing 110 included in the LIDAR device 100 can provide a platform for mounting the various components included in the LIDAR device 100. The housing 110 can be formed from any material capable of supporting the various components of the LIDAR device 100 included in an interior space of the housing 110. For example, the housing 110 may be formed from a solid material such as plastic or metal among other possibilities.

In some examples, the housing 110 can be configured to have a substantially cylindrical shape and to rotate about an axis of the LIDAR device 100. For example, the housing 110 can have the substantially cylindrical shape with a diameter of approximately 10 centimeters. In some examples, the axis of the LIDAR device 100 is substantially vertical. By rotating the housing 110 that includes the various components, in some examples, a three-dimensional map of a 360-degree view of the environment of the LIDAR device 100 can be determined. Additionally or alternatively, in some examples, the LIDAR device 100 can be tilted, e.g., such that the axis of rotation of the housing 110 provides a particular field of view for the LIDAR device 100.

The lens 150 mounted to the housing 110 can have an optical power to both collimate the emitted light beams 104, and focus the reflected light 106 from one or more objects in the environment of the LIDAR device 100 onto detectors in the LIDAR device 100. In one example, the lens 150 has a focal length of approximately 120 mm. By using the same lens 150 to perform both of these functions, instead of a transmit lens for collimating and a receive lens for focusing, advantages with respect to size, cost, and/or complexity can be provided.

The LIDAR device 100 can be mounted on a mounting structure 160 that rotates about an axis to provide a 360-degree view of the environment surrounding the LIDAR device 100. In some examples, the mounting structure 160 may comprise a movable platform that may tilt in one or more directions to change the axis of rotation of the LIDAR device 100.

Figure 1B:
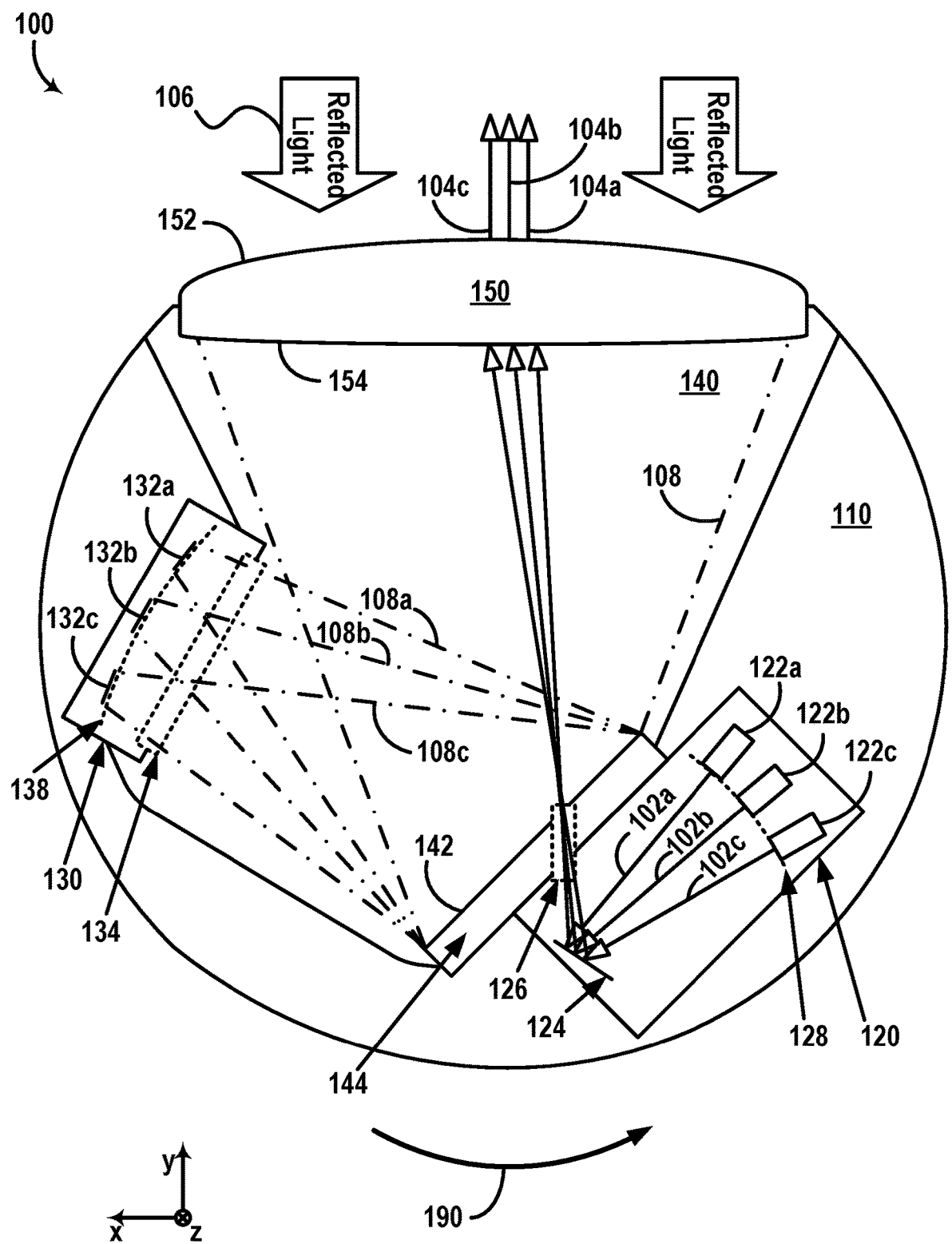
FIG. 1B is a cross-section view of the LIDAR device shown in FIG. 1A.

FIG. 1B is a cross-section view of the LIDAR device 100. As shown, the housing 110 includes a transmitter 120, a receiver 130, a shared space 140, and the lens 150. For purposes of illustration, FIG. 1B shows an x-y-z axis, in which the z-axis is pointing out of the page.

The transmitter 120 includes a plurality of light sources 122a-c that may be arranged along a curved focal surface 128 defined by the lens 150. The plurality of light sources 122a-c can be configured to emit, respectively, the plurality of light beams 102a-c having wavelengths within a wavelength range. For example, the plurality of light sources 122a-c may comprise laser diodes that emit the plurality of light beams 102a-c having the wavelengths within the wavelength range. The plurality of light beams 102a-c are reflected by mirror 124 through an exit aperture 126 into the shared space 140 and towards the lens 150.

The light sources 122a-c can include laser diodes, light emitting diodes (LED), laser bars (e.g., diode bars), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 102a-c. In some examples, the light sources 122a-c can be configured to emit the emitted light beams 102a-c in a wavelength range that can be detected by detectors 132a-c included in the receiver 130. The wavelength range could, for example, be in the ultraviolet, visible, and/or infrared portions of the electromagnetic spectrum. In some examples, the wavelength range can be a narrow wavelength range, such as provided by lasers. In one embodiment, the wavelength range includes a source wavelength of 905 nm. Additionally, the light sources 122a-c can be configured to emit the emitted light beams 102a-c in the form of pulses. In some examples, the plurality of light sources 122a-c can be disposed on one or more substrates (e.g., printed circuit boards (PCB), flexible PCBs, etc.) and arranged to emit the plurality of light beams 102a-c towards the exit aperture 126.

Although FIG. 1B shows that the curved focal surface 128 is curved in a horizontal plane (e.g., x-y plane), additionally or alternatively, the light sources 122a-c may be arranged along a focal surface that is curved in a vertical plane. For example, the curved focal surface 128 can have a curvature in a vertical plane, and the plurality of light sources 122a-c can include additional light sources arranged vertically along the curved focal surface 128 and configured to emit light beams directed at the mirror 124 and reflected through the exit aperture 126. In this example, the detectors 132a-c may also include additional detectors that correspond to additional light sources of the light sources 122a-c. Further, in some examples, the light sources 122a-c may include additional light sources arranged horizontally along the curved focal surface 128. In one embodiment, the light sources 122a-c may include 64 light sources that emit light having a wavelength of 905 nm. For instance, the 64 light sources may be arranged in four columns, each comprising 16 light sources, along the curved focal surface 128. In this instance, the detectors 132a-c may include 64 detectors that are arranged similarly (e.g., 4 columns comprising 16 detectors each, etc.) along curved focal surface 138. In other embodiments, the light sources 122a-c and the detectors 132a-c may include additional or fewer light sources and/or detectors than those shown in FIG. 1B.

Due to the arrangement of the plurality of light sources 122a-c along the curved focal surface 128, the plurality of light beams 102a-c, in some examples, may converge towards the exit aperture 126. Thus, in these examples, the exit aperture 126 may be minimally sized while being capable of accommodating vertical and horizontal extents of the plurality of light beams 102a-c. Additionally, in some examples, the curved focal surface 128 can be defined by the lens 150. For example, the curved focal surface 128 may correspond to a focal surface of the lens 150 due to shape and composition of the lens 150. In this example, the plurality of light sources 122a-c can be arranged along the focal surface defined by the lens 150 at the transmitter.

The plurality of light beams 102a-c propagate in a transmit path that extends through the transmitter 120, the exit aperture 126, and the shared space 140 towards the lens 150. The lens 150 may collimate the plurality of light beams 102a-c to provide collimated light beams 104a-c into an environment of the LIDAR device 100. The collimated light beams 104a-c may correspond, respectively, to the plurality of light beams 102a-c. In some examples, the collimated light beams 104a-c reflect off one or more objects in the environment of the LIDAR device 100 as reflected light 106. The reflected light 106 may be focused by the lens 150 into the shared space 140 as focused light 108 traveling along a receive path that extends through the shared space 140 toward the receiver 130. For example, the focused light 108 may be reflected by the reflective surface 142 as focused light 108a-c propagating toward the receiver 130.

Thus, the lens 150 may be capable of both collimating the plurality of light beams 102a-c and focusing the reflected light 106 based on the shape and composition of the lens 150. For example, the lens 150 can have an aspheric surface 152 facing outside of the housing 110 and a toroidal surface 154 facing the shared space 140. By using the same lens 150 to perform both of these functions, instead of a transmit lens for collimating and a receive lens for focusing, advantages with respect to size, cost, and/or complexity can be provided.

As shown, the exit aperture 126 is included in a wall 144 that separates the transmitter 120 from the shared space 140. In some examples, the wall 144 can be formed from a transparent material (e.g., glass) that is coated with a reflective material 142. In this example, the exit aperture 126 may correspond to the portion of the wall 144 that is not coated by the reflective material 142. Additionally or alternatively, the exit aperture 126 may comprise a hole or cut-away in the wall 144.

The focused light 108 is reflected by the reflective surface 142 and directed toward an entrance aperture 134 of the receiver 130. In some examples, the entrance aperture 134 may comprise a filtering window configured to transmit wavelengths in the wavelength range of the plurality of light beams 102a-c (e.g., source wavelength) emitted by the plurality of light sources 122a-c and attenuate other wavelengths. In some examples, the entrance aperture 134 may comprise a half-mirror configured to reflect a portion of the focused light 108a-c and allow another portion of the focused light 108a-c to propagate toward the detectors 132a-c. Thus, as shown, at least a portion of the focused light 108a-c propagates toward a plurality of detectors 132a-c.

The plurality of detectors 132a-c can be arranged along a curved focal surface 138 of the receiver 130. Although FIG. 1B shows that the curved focal surface 138 is curved along the x-y plane (horizontal plane), additionally or alternatively, the curved focal surface 138 can be curved in a vertical plane. The curvature of the focal surface 138 may be defined by the lens 150. For example, the curved focal surface 138 may correspond to a focal surface of the light projected by the lens 150 along the receive path at the receiver 130.

The detectors 132a-c may comprise photodiodes, avalanche photodiodes, phototransistors, cameras, active pixel sensors (APS), charge coupled devices (CCD), cryogenic detectors, or any other sensor of light configured to receive focused light 108a-c having wavelengths in the wavelength range of the emitted light beams 102a-c (e.g., the source wavelength).

Each of the focused light 108a-c may correspond, respectively, to reflections of the emitted light beams 102a-c and is directed toward, respectively, the plurality of detectors 132a-c. For example, the detector 132a is configured and arranged to received focused light 108a that corresponds to collimated light beam 104a reflected off the one or more objects in the environment of the LIDAR device 100. In this example, the collimated light beam 104a corresponds to the light beam 102a emitted by the light source 122a. Thus, the detector 132a receives light that was emitted by the light source 122a, the detector 132b receives light that was emitted by the light source 122b, and the detector 132c receives light that was emitted by the light source 122c.

By comparing the received light 108a-c with the emitted light beams 102a-c, at least one aspect of the one or more object in the environment of the LIDAR device 100 may be determined. For example, by comparing a time when the plurality of light beams 102a-c were emitted by the plurality of light sources 122a-c and a time when the plurality of detectors 132a-c received the focused light 108a-c, a distance between the LIDAR device 100 and the one or more object in the environment of the LIDAR device 100 may be determined. In some examples, other aspects such as shape, color, material, etc. may also be determined.

In some examples, the LIDAR device 100 may be rotated about an axis to determine a three-dimensional map of the surroundings of the LIDAR device 100. For example, the LIDAR device 100 may be rotated about a substantially vertical axis as illustrated by arrow 190. Although illustrated that the LIDAR device 100 is rotated counterclockwise about the axis as illustrated by the arrow 190, additionally or alternatively, the LIDAR device 100 may be rotated in the clockwise direction. In some examples, the LIDAR device 100 may be rotated 360 degrees about the axis. In other examples, the LIDAR device 100 may be rotated back and forth along a portion of the 360 degree view of the LIDAR device 100. For example, the LIDAR device 100 may be mounted on a platform that pivots back and forth about the axis without making a complete rotation.

Thus, the arrangement of the light sources 122a-c and the detectors 132a-c may allow the LIDAR device 100 to have a particular vertical field-of-view. In one example, the vertical FOV of the LIDAR device 100 is 20°. Additionally, the rotation of the LIDAR device 100 may allow the LIDAR device 100 to have a 360° horizontal FOV. Further, the rate of rotation may allow the device to have a particular refresh rate. In one example, the refresh rate is 10 Hz. The refresh rate along with the arrangement of the light sources 122a-c and the detectors 132a-c may also allow the LIDAR device 300 to have a particular angular resolution. In one example, the angular resolution is 0.2°×0.3°. However, the various parameters such as the refresh rate and the angular resolution may vary according to the configuration of the LIDAR device 100. Further, in some examples, the LIDAR device 100 may include additional, fewer, or different components than those shown in FIGS. 1A-1B.

Figure 1C:
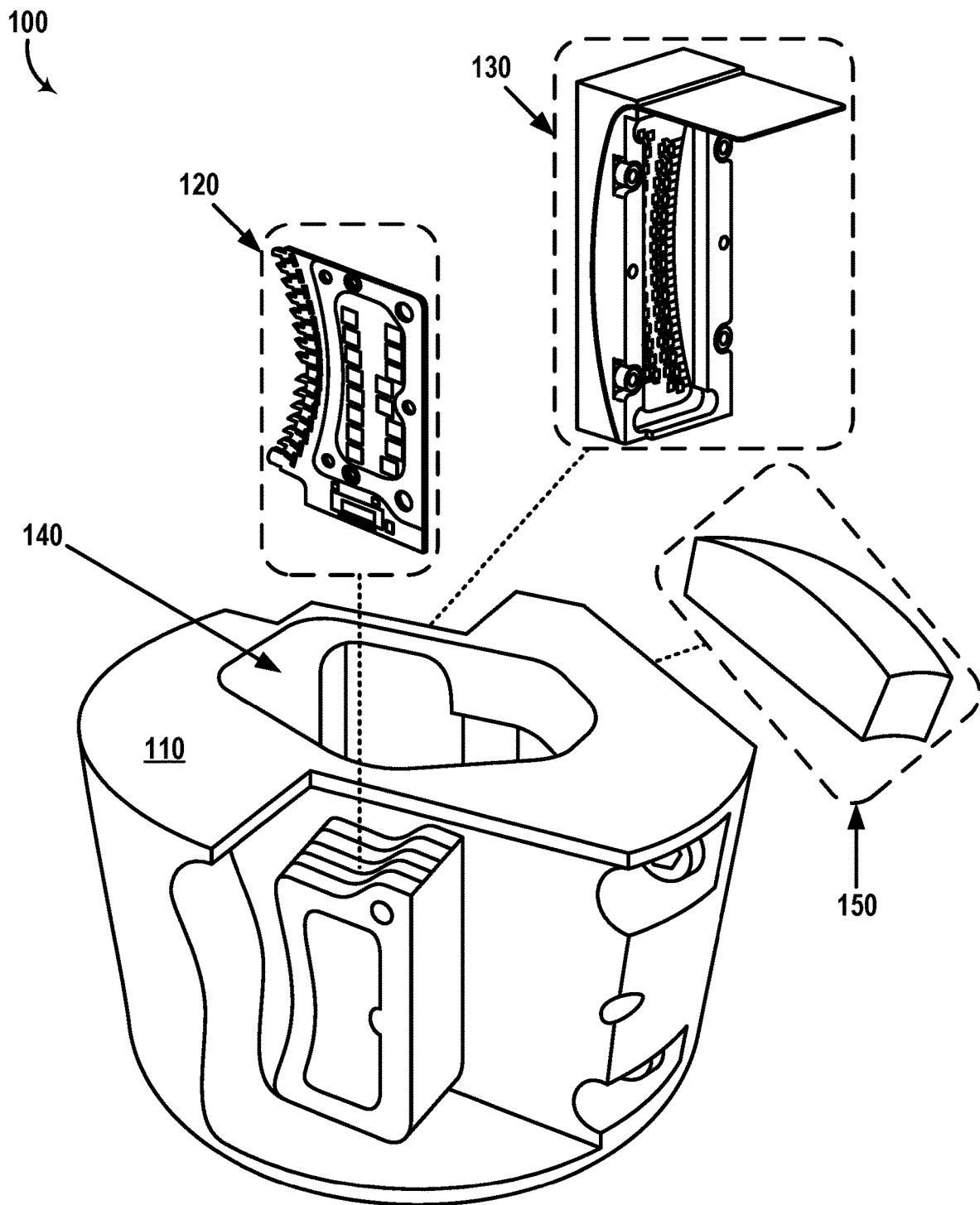
FIG. 1C is a perspective view of the LIDAR device shown in FIG. 1A with various components removed to illustrate an interior of the LIDAR device.

FIG. 1C is a perspective view of the LIDAR device 100 shown in FIG. 1A with various components removed to illustrate an interior of the LIDAR device 100. As shown, the various components of the LIDAR device 100 can be removably mounted to the housing 110. For example, the transmitter 120 may comprise one or more printed circuit boards (PCBs) that are fitted in the portion of the housing 110 where the transmitter 120 can be mounted. Although FIG. 1C shows the transmitter 120 with one PCB, in some embodiments, the transmitter 120 may include multiple PCBs (not shown) that each include some of the plurality of light sources 132a-c. In one embodiment, each PCB in the transmitter may include 16 light sources, and the transmitter 120 may include four PCBs. Thus, in this embodiment, the LIDAR device 100 may include 64 light sources. Other embodiments are possible as well where the transmitter 120 includes a different number of light sources. Additionally, the receiver 130 may comprise a plurality of detectors (e.g., detectors 132a-c, etc.) mounted to a flexible substrate and can be removably mounted to the housing 110 as a block that includes the plurality of detectors. Similarly, the lens 150 can be mounted to another side of the housing 110.

Figure 2:
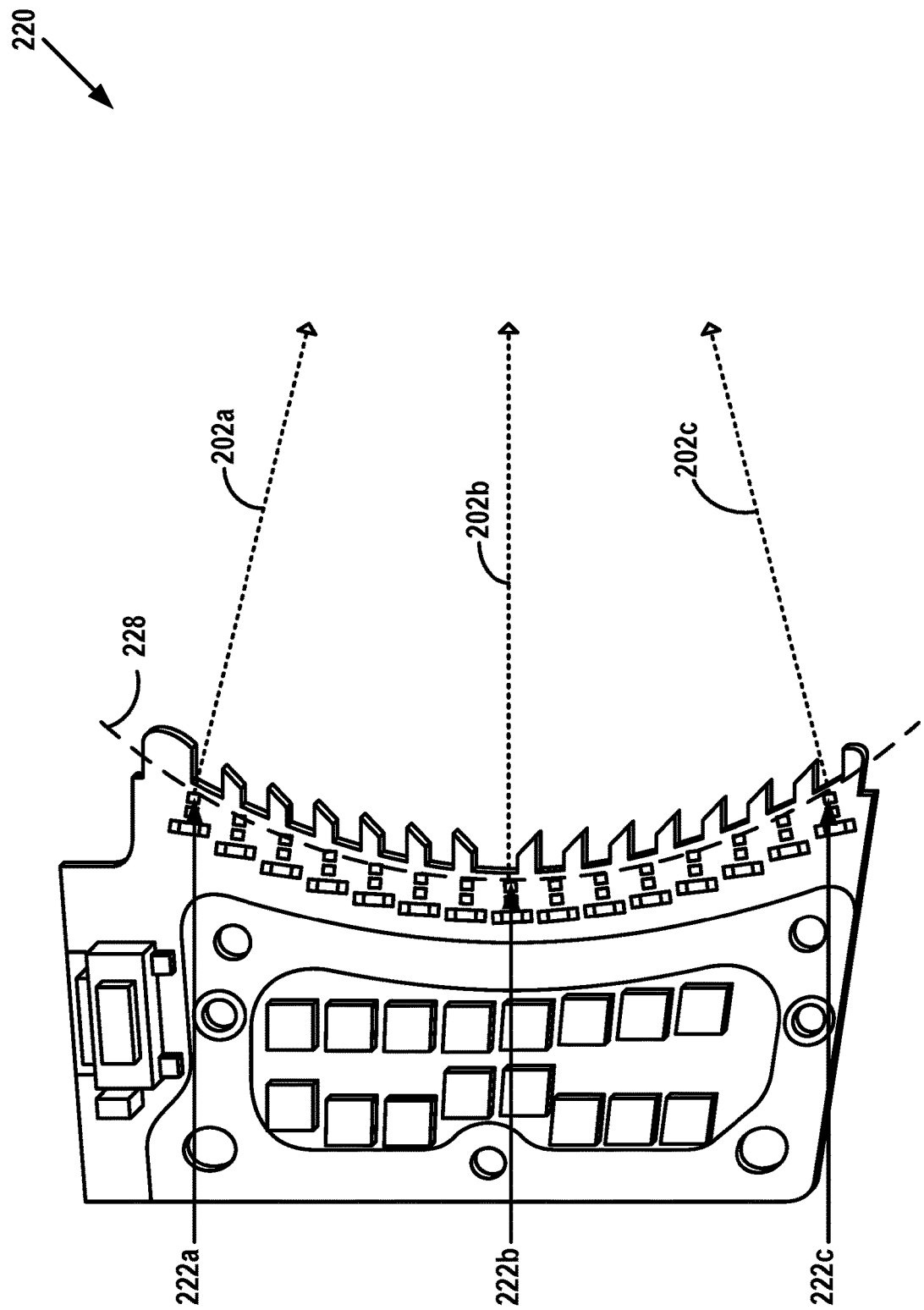
FIG. 2 illustrates a LIDAR transmitter, according to an example embodiment.

FIG. 2 illustrates a LIDAR transmitter 220, according to an example embodiment. Transmitter 220 may be similar to the transmitter 120 of LIDAR 100. For example, the transmitter 220 includes a plurality of light sources 222a-c, which may include any type of light source (e.g., LED, etc.) similarly to the plurality of light sources 122a-c of the transmitter 120. As shown, the light sources 222a-c are arranged along a focal surface 228, which is curved in a vertical plane. Further, as shown, the light sources 222a-c are configured to emit a plurality of light beams 202a-c. It is noted that the directions of the light beams 202a-c are illustrated as shown only for convenience in description. Thus, in some implementations, the directions of the light beams 202a-c relative to the focal surface 228 may differ from the directions shown.

Although the plurality of light sources 222a-c can be arranged along a focal surface 228 that is curved in a vertical plane, additionally or alternatively, the plurality of light sources 222a-c can be arranged along a focal surface that is curved in a horizontal plane or a focal surface that is curved both vertically and horizontally. For example, the plurality of light sources 222a-c can be arranged in a curved three dimensional grid pattern. For instance, the transmitter 220 may comprise a plurality of printed circuit boards (PCBs) vertically mounted such that a column of light sources (e.g., similar to light sources 222a-c) are along the vertical axis of each PCB and each of the plurality of PCBs can be arranged adjacent to other vertically mounted PCBs along a horizontally curved plane to provide the three dimensional grid pattern. Alternatively, in some examples, the light sources 222a-c may be arranged along any other surface such as a linear or flat surface. Further, although the transmitter 220 is shown to include multiple light sources 222a-c, in some examples, the transmitter 220 may include only one light source or a different number of light sources than those shown in FIG. 2.

Further, it is noted that the arrangement of the light sources in the transmitter 220 is illustrated as shown only for convenience in description. Thus, in some implementations, the arrangement of the light sources may be different than the arrangement shown (e.g., different light source positions, different or non-uniform spacing between one or more pairs of adjacent light sources, etc.).

Figure 3A:
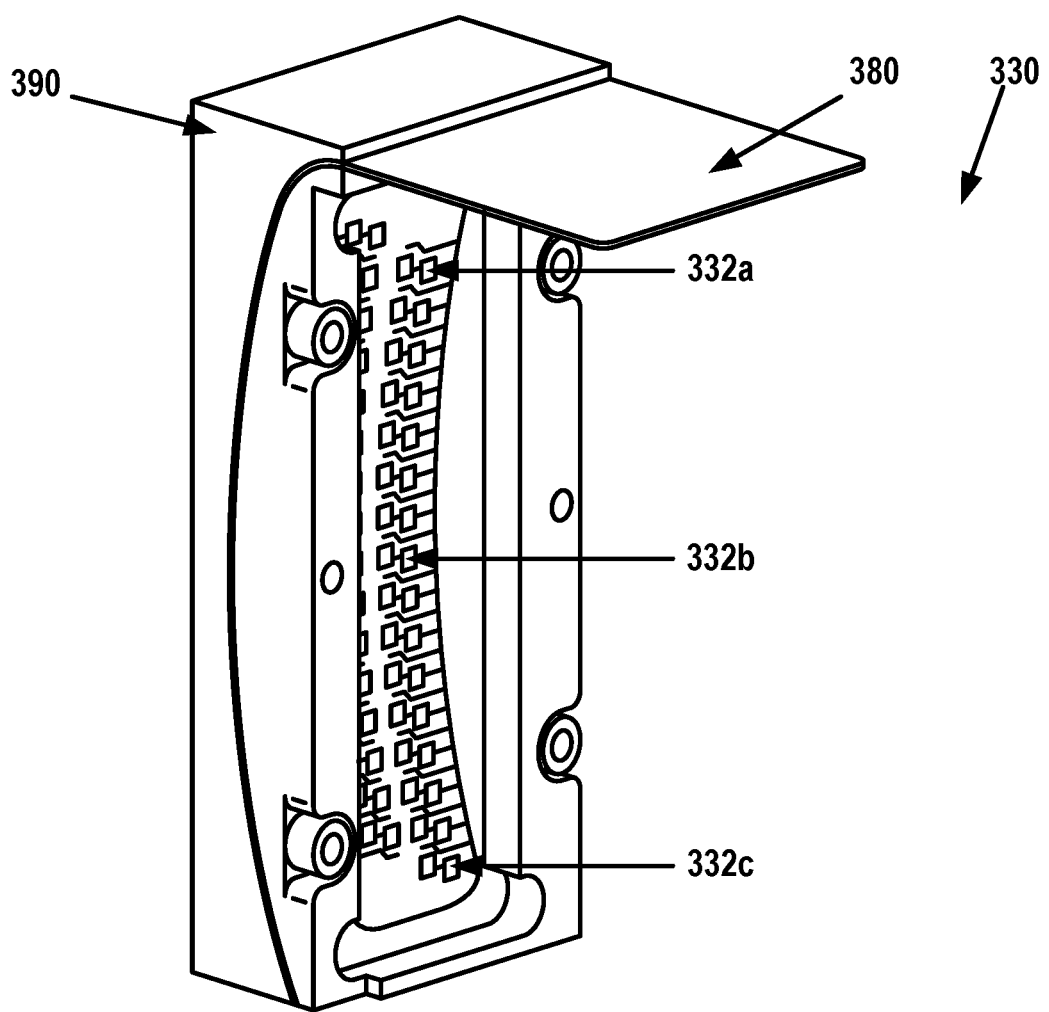
FIG. 3A illustrates a LIDAR receiver, according to an example embodiment.
Figure 3B:
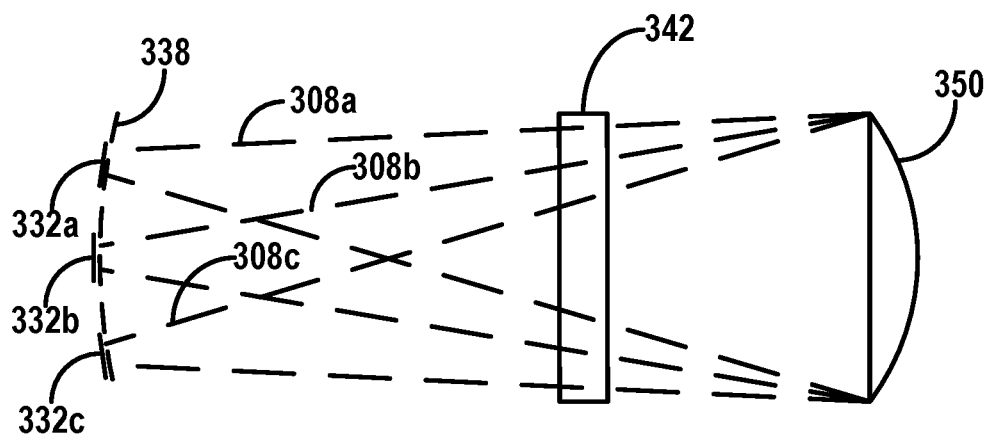
FIG. 3B illustrates a side view of three detectors included in the receiver of FIG. 3A.

FIG. 3A illustrates a LIDAR receiver 330, according to an example embodiment. FIG. 3B illustrates a side view of three detectors 332a-c included in the receiver 330 of FIG. 3A. Receiver 330 may be similar to the receiver 130. For example, as shown, the receiver 330 includes a plurality of detectors 332a-c arranged along a curved surface 338 defined by a lens 350 that are similar, respectively, to the receiver 130, the detectors 132a-c, the curved plane 138, and the lens 150. Focused light 308a-c from lens 350 propagates along a receive path that includes a reflective surface 342 onto the detectors 332a-c similarly to, respectively, the focused light 108a-c, the lens 150, the reflective surface 142, and the detectors 132a-c.

The receiver 330 may comprise a flexible substrate 380 on which the plurality of detectors 332a-c are arranged along the curved surface 338. The flexible substrate 380 may be conformed to the curved surface 338 by being mounted to a receiver housing 390 having the curved surface 338. As shown, the curved surface 338 includes the arrangement of the detectors 332a-c curved along a vertical and horizontal axis of the receiver 330.

In some examples, the number and/or arrangement of the detectors 332a-c may be different than shown in FIGS. 3A-3B. In a first example, the detectors 332a-c may be alternatively arranged along a linear or flat surface. In a second example, the receiver 330 may alternatively include only one detector, or may include another number of detectors. In a third example, one or more of the detectors in the receiver 330 can alternatively have different positions than the positions shown. In a fourth example, the detectors in the receiver 330 can be alternatively arranged such that a first distance between a first detector and a second detector (adjacent to the first detector) is different than a second distance between the second detector and a third detector (adjacent to the second detector). Other examples are possible.

II. Example Optics Alignment Systems

Example systems for optics alignment will now be described in greater detail. The example systems described herein can be employed with various types of LIDAR devices, such as LIDAR device 100 for example, as well as other LIDAR device configurations.

Figure 4:
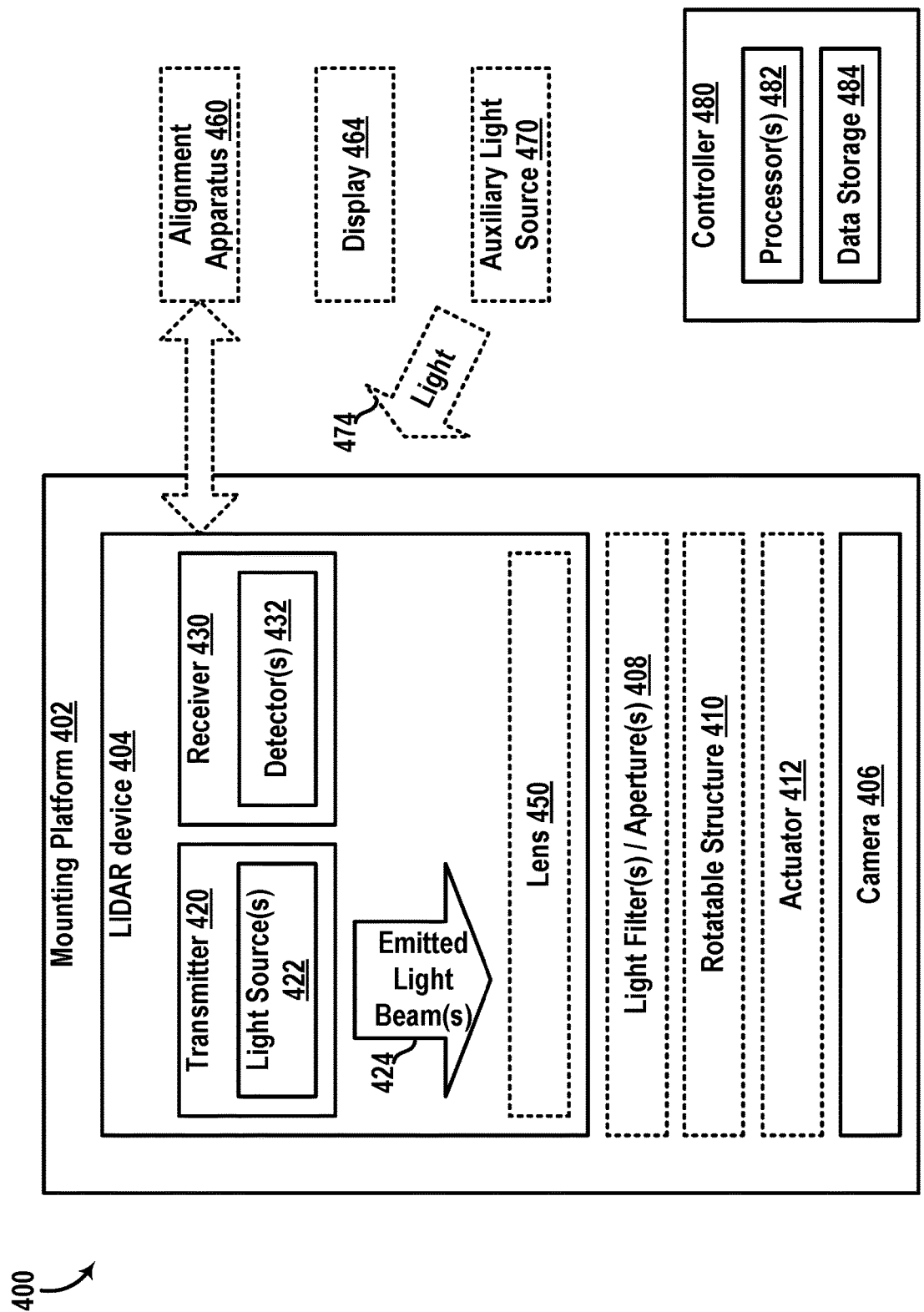
FIG. 4 is a block diagram of a system, according to an example embodiment.

FIG. 4 is a block diagram of a system 400, according to an example embodiment. As shown, the system 400 includes a mounting platform 402 and a controller 480. The system 400 may also optionally include an alignment apparatus 460, a display 464, and an auxiliary light source 470.

The mounting platform 402 may comprise a platform for mounting some or all of the components of the system 400. As shown, the mounting platform 402 mounts a LIDAR device 404 and a camera 406. In some examples, the mounting platform 402 may also mount one or more light filters (and/or apertures) 408, a rotatable structure 410, and/or an actuator 412. Accordingly, the mounting platform 402 may be formed from one or more solid materials suitable for supporting the various components, such as plastics or metals among other possibilities. Additionally or alternatively, the mounting platform 402 may include one or more structures arranged to support the various components of system 400 in a particular arrangement. In some examples, some of the components shown to be mounted on the mounting platform 402 may alternatively be mounted to a separate structure (not shown) or otherwise coupled to the system 400. For instance, the camera 406 and/or the light filter(s) 408 may be alternatively positioned and/or mounted outside the mounting platform 402.

The LIDAR device 404 may be similar to the LIDAR device 100. For example, as shown, the LIDAR device 404 includes a transmitter 420 that may be similar to transmitters 120 and 220. Further, the LIDAR device 404 includes a receiver 430 that may be similar to receivers 130 and 330. As shown, in some examples, the LIDAR device 404 may optionally include a lens 450, similar to lenses 150 and/or 350.

The transmitter 420 includes one or more light sources 422 that may be configured to emit one or more light beams 424, similarly to transmitters 120, 220, light sources 122, 222, and light beams 104, 204.

The receiver 430 includes one or more detectors 432 that may be configured to receive light from an environment of the LIDAR device 404, similarly to the detectors 132a-c, 332a-c of receivers 130, 330.

The lens 450 may be optionally included in the LIDAR device 404 and may be configured to collimate the emitted light beams 424 and/or focus light propagating toward the detectors 432, similarly to lenses 150 and 350 for example. In one embodiment, the lens 450 may be a single lens having an optical power to both collimate the light beams 424 and focus light onto the detectors 432. In another embodiment, the lens 450 may include two separate lenses. For example, a first lens may collimate the light beam(s) 424 emitted by the light source(s) 422, and a second lens may focus light propagating toward the LIDAR device 404 onto the detector(s) 432. Other lens configurations are possible as well (e.g., multiple lenses for collimation and/or multiple lenses for focus, etc.).

In some examples, the LIDAR device 404 may include additional, fewer, or different components than those shown in FIG. 1. Thus, in some embodiments, the system 400 may be utilized for assembly, manufacture, and/or calibration of various LIDAR devices having various configurations, such as the configuration of the LIDAR device 404 or another LIDAR device configuration. Accordingly, in some examples, the LIDAR device 404 may be removably mounted to the mounting platform 402 to facilitate such calibration or assembly.

In some examples, the various components of the LIDAR device 404 such as the transmitter 420, the receiver 430, and the lens 450 can be removably or adjustably mounted within the LIDAR device 404. To that end, the system 400 may adjust the mounting positions of the transmitter 420 and the receiver 430 relative to one another to align the one or more light sources 422 with the one or more detectors 432. Alternatively, in other examples, the system 400 may be configured to adjust the relative position between each of the subcomponents (e.g., each light source of light sources 422, each detector of detectors 432, etc.).

The camera 406 may be any camera (e.g., a still camera, a video camera, etc.) configured to capture images of the LIDAR device 404. In some examples, the camera 406 may be located at a given position at which the camera 406 can image the light beams 424 emitted by the one or more light sources 422, and can image the one or more detectors 432. In one embodiment, the camera 406 may be focused at or near infinity when capturing such images.

Generally, a camera focus setting of "infinity" may allow a camera to obtain a sharp (e.g., "in-focus") image of a distant object. For instance, light from the distant object may resemble substantially parallel light beams incident on a camera lens of the camera. Further, the camera focus setting of "infinity" may correspond to a setting where the substantially parallel light beams are focused onto a focal plane of the camera. As a result, the camera can obtain a relatively sharp (e.g., "in-focus") image of the distant object. Whereas, for instance, closer objects may appear "out-of-focus" (e.g., blurry, etc.) in the image associated with the infinity focus setting.

Thus, in the context of system 400 for example, the camera 406 may be mounted to have a field-of-view along the path of the light beams 424 (e.g., facing the lens 450, etc.). Further, in this example, the lens 450 of the LIDAR device 400 may optionally be configured to collimate light beams 424 (e.g., into9 a plurality of substantially parallel light beams). Thus, in this example, a camera focus setting of "infinity" may allow the camera 406 to capture an image where the light sources 422 are "in-focus."

As an example scenario for operation of the camera 406, the LIDAR device 404 may be configured to cause the light sources 422 to emit the light beams 424 toward the camera 406. In turn, the camera 406 may provide a first image of the light beams 424. The first image, for instance, may indicate light source position(s) (e.g., bright pixels in the first image, etc.) of the light source(s) 422. In the scenario, the camera may also obtain a second image indicative of detector position(s) of the detector(s) 432. Other scenarios are possible as well and are described in greater detail within exemplary embodiments herein.

The light filter(s) (and/or aperture(s)) 408 may be optionally included in the system 400 to facilitate capture and/or processing of the images described above. To that end, light filter(s) 408 may include any combination of optical elements that selectively transmit light incident thereon.

In a first example, the light filters 408 may comprise a first light filter positioned along a path of the light beams 424 between the LIDAR device 404 and the camera 406 while the camera is obtaining an image of the light beams. The first light filter may be configured to attenuate light within a wavelength range that includes the source wavelength of the light source(s) 422. In this example, the attenuation of the light may facilitate contrasting pixels in the image of the light beams 424 against surrounding pixels. Further, in this example, the attenuation of the light may protect the camera 406 from the intensity of the light beams 424.

In a second example, the light filters 408 may comprise a second light filter configured to attenuate light within another wavelength range that does not include the source wavelength of the light source(s) 422. In this example, the images obtained by the camera 406 (through the second light filter) may represent features of interest (e.g., light source(s) 422, detector(s) 432, etc.) in the LIDAR device 404 more clearly due to the attenuation of background light having wavelengths other than the source wavelength.

In a third example, the light filters 408 may comprise a third light filter that defines a first aperture configured to be interposed between the LIDAR device 404 and the camera 406 at a first position relative to the camera while the camera is obtaining an image of the detectors 432. For instance, the third light filter may comprise an opaque material (e.g., opaque to a wavelength range that includes the source wavelength of the light beams 424, etc.) surrounding a cavity or a transparent material (e.g., transparent to the wavelength range including the source wavelength). In this instance, the cavity or transparent material may correspond to the first aperture. Further, in some implementations, when the first aperture is interposed between the LIDAR device 404 and the camera 406, the first position of the first aperture may correspond to a predefined offset position relative to an optical axis of the camera 406 (or a camera lens thereof). As such, an image captured by the camera 406 while the first aperture is at the first position may indicate distorted positions, shapes, sizes, etc., of the detectors 432.

In a fourth example, the light filter(s) 408 may comprise a fourth light filter that defines a second aperture configured to be interposed between the LIDAR device 404 and the camera 406 at a second position (different than the first position) while the camera is obtaining another image of the detectors 432. As such, another image captured by the camera 406 while the second aperture is at the second position may indicate different distorted positions, shapes, sizes, etc., of the detectors 432.

In some implementations, the system 400 can determine information about the alignment of the receiver 430 by comparing the respective distortions indicated by the two images associated with the first aperture and the second aperture. For example, the first position of the first aperture may correspond to a first offset position in a first direction from an optical axis of the camera, and the second position of the second aperture may correspond to a second offset position in a second direction from the optical axis (e.g., opposite to the first direction). In this example, the distortions in a first image associated with the first aperture may be exaggerated near one end of the first image, and the distortions in a second image associated with the second aperture may be exaggerated near an opposite end of the second image. Thus, for instance, the system 400 can determine an indication of depth distances between the camera 406 and the detectors 432 by comparing the distorted locations of the detectors 432 in the first image with the distorted locations of the detectors 432 in the second image.

Other configurations of the light filter(s) 408 (and/or alignment offset determinations based on a comparison of images captured by the camera 406) are possible as well, and are described in greater detail within exemplary embodiments herein.

Additionally, various implementations of the system 400 are possible to facilitate interposing a particular aperture or light filter of the light filters 408 between the LIDAR device 404 and the camera 406. In one example, the system 400 may include a robotic device (not shown) or other mechanical device configured to move the particular aperture or light filter to a given position between the LIDAR device 404 and the camera 406 (and/or to remove the particular aperture from the given position). Thus, in some examples, a first aperture or light filter can be replaced with a second (physically separate) aperture or light filter between image capture events.

Alternatively or additionally, in some examples, the LIDAR device 404 and the camera 406 can be mounted in fixed positions, and one or more characteristics of a particular aperture or light filter (interposed between the LIDAR device 404 and the camera 406) can be adjusted between image capture events.

In a first example, an aperture (e.g., slit, etc.) can be moved in a linear direction (relative to the LIDAR device 404 and the camera 406) from a first position to a second position. Thus, for instance, a single structure defining the aperture can be used to obtain a first image when the aperture is in the first position (relative to the LIDAR device 404 and the camera 406), and to obtain a second image after the aperture (and/or the single structure) is moved to the second position.

In a second example, an aperture (or light filter) can be rotated to modify a position and/or orientation of the aperture (relative to the LIDAR device 404 and the camera 406). For instance, distortion characteristics of an image captured through the aperture may vary depending on the orientation of the aperture when the image was captured through the aperture. Further, for instance, filtering characteristics (e.g., polarization of filtered light, etc.) of a light filter may vary depending on the orientation of the light filter.

In a third example, a size and/or shape of an aperture (or light filter) can be dynamically adjusted between image capture events. For instance, an aperture can be physically implemented as a re-sizeable region defined by an adjustable structure (e.g., shutter, sliding structure at least partially overlaid on a slit, etc.). To that end, the adjustable structure may be configured to dynamically adjust or modify the size or shape of the aperture (e.g., size of slit or cavity, exposed portion of the re-sizeable region, etc.). Other examples are possible as well.

Thus, in some implementations, one or more of the light filters 408 can be physically implemented as a single structure that is adjusted (e.g., moved, resized, etc.) between image capture events. Alternatively or additionally, in some implementations, one or more of the light filters 408 can be physically implemented within one or more respective interchangeable structures, and a particular structure of the interchangeable structures can then be selected, actuated, etc., to interpose a particular aperture or light filter (disposed in the particular structure) between the LIDAR device 404 and the camera 406.

In one particular embodiment, the rotatable structure 410 may be optionally included in the system 400 to facilitate interposing a particular aperture or light filter of the light filters 408 between the LIDAR device 404 and the camera 406. For example, the rotatable structure 410 may support an arrangement of the light filters 408. In this example, the rotatable structure 410 may rotate about an axis thereof. Further, a given configuration of the rotatable structure 410 (e.g., position or orientation about the axis) may correspond to a given light filter of the light filters 408 being interposed between the LIDAR device 404 and the camera 406. For instance, the rotatable structure may be configured to resemble a fan assembly, where each blade of the fan assembly has a window in which a corresponding filter (or aperture) of the light filters 408 is supported. To that end, the rotatable structure 410 may include any combination of solid materials suitable for supporting the light filters 408 in the arrangement (e.g., fan assembly, etc.).

The actuator 412 may be optionally included in the system 400. The actuator 412 may be configured to adjust the position of the light filter(s) 408. For instance, the actuator 412 may be configured to arrange the light filter(s) 408 to a first configuration where a first light filter is interposed between the LIDAR device 404 and the camera 406, a second configuration where a second light filter is interposed between the LIDAR device 404 and the camera 406, or a third configuration where none of the light filters 408 are not interposed between the LIDAR device 404 and the camera 406. For instance, the actuator 412 may be configured to rotate the rotatable structure 410 about its axis. In other instances, the actuator 412 may be used in the operation of the robotic device discussed above. A non-exhaustive list of example actuators may include motors, stepper motors, pneumatic actuators, hydraulic pistons, relays, solenoids, and piezoelectric actuators, among other possibilities.

The system 400 can optionally include the alignment apparatus 460 to adjust the relative mounting positions of the transmitter 420 and/or the receiver 430 in the LIDAR device 404. To that end, the alignment apparatus 460 may include any device that couples to one or more of the components in the LIDAR device 404. By way of example, the alignment apparatus 460 may be a robotic arm that physically couples to the receiver 430 to rotate and/or translate the mounting position of the receiver 430 in the LIDAR 404. Alternatively or additionally, for example, the robotic arm may adjust the mounting position of the transmitter 420. In some examples, the alignment apparatus 460 may adjust the relative position between the transmitter 420 and the receiver 430 based on image(s) obtained using the camera 406. For instance, the alignment apparatus 460 may adjust the relative position to align one or more of the light beams 424 emitted by the light sources 422 with one or more of the detectors 432.

The optical components (i.e., the transmitter 420 and the receiver 430) of the LIDAR device 404 may each have six degrees of freedom (DOF). In some examples, the alignment apparatus 460 may adjust the relative position between the transmitter 420 and the receiver 430 by adjusting some or all of the six DOF (e.g., x, y, z, roll, pitch, and/or yaw) of the mounting position of one or both of the transmitter 420 and the receiver 430.

The system 400 may optionally include display 464 to display information about the images captured by the camera 406 and/or alignment offsets computed based on the captured images. To that end, display 464 may include any type of display (e.g., liquid crystal display, LED display, etc.). Thus, for instance, the display 464 may have a graphical user interface (GUI) for displaying and/or interacting with images captured by the camera 406, and a human operator or a computer operator may interface with the GUI to adjust the relative mounting positions of the transmitter 420 and the receiver 430 by manipulating the images in the GUI.

The system 400 may optionally include an auxiliary light source 470 that emits light 474 at the source wavelength to illuminate the receiver 430. To that end, for example, the structure and form of the auxiliary light source 470 (e.g., LED, etc.) may be similar to the light sources 422. For instance, where the camera 406 is configured to capture images when focused at or near infinity for the source wavelength of the light sources 422, the auxiliary light source 470 may illuminate the detectors 432 to facilitate the camera 406 obtaining an image of the detectors 432 while also focused at or near infinity for the same source wavelength. By way of example, the light 474 (or a portion thereof) emitted by auxiliary light source 470 may reflect off the detectors 432 toward the lens 450 of the LIDAR device 404. Further, in this example, at least a portion of the reflected light 474 from the detectors 432 may be collimated by the lens 450 (similarly to the collimated light beams 424). Thus, as discussed above with respect to the image of the light sources 422, the camera 406 (while focused at or near infinity) may similarly capture a relatively sharp (e.g., "in-focus") image of the detectors 432 (e.g., at least in a scenario where the transmitter 420 is aligned with the receiver 430).

In some embodiments however, the camera 406 can be alternatively configured to obtain the image of the detectors 432 (and/or the image of the light sources 422) while the camera is focused according to another focus setting (e.g., other than being focused at or near infinity).

In some examples, a particular light filter of light filters 408 may be configured to remain interposed between the camera 406 and the LIDAR device 404 during capture of the image of the light beams 424 and during capture of one or more images of the detectors 432. For example, the particular light filter may correspond to a light filter that attenuates background light, while allowing at least some of the light at the source wavelength of the light 424 and/or 474 to propagate toward the camera. In these examples, the illuminating light 474 from the auxiliary light source 470 together with the particular light filter may thus allow the system 400 to reduce the background noise from the images captured by the camera 406.

The controller 480 may include one or more processors 482 configured to operate some or all of the components of the system 400 in line with the discussion above. To that end, the controller 480 may be coupled to the various components via a wired or wireless interface (not shown). For example, the controller 480 may execute program functions stored in a non-transitory computer readable medium (e.g., data storage 484) to cause the system 400 to perform various functions and processes of the present method. To that end, processor 482 may comprise one or more general-purpose processors and/or one or more special purpose processors. To the extent that processor 482 includes more than one processor, such processors could work separately or in combination. Data storage 484, in turn, may comprise one or more volatile and/or one or more non-volatile storage components, such as optical, magnetic, organic storage, and/or other types of non-transitory computer readable media. Further, in some embodiments, data storage 484 may be integrated in whole or in part with processor 482. In some embodiments, data storage 484 may contain instructions (e.g., program logic) executable by processor 482 to cause system 400 and/or components thereof to perform the various operations described herein. Alternatively or additionally, for example, the controller 480 may include analog and/or digital circuitry wired to perform one or more of the functions described herein.

In a first example, the controller 480 may cause a power source (not shown) to provide power to the various components of the system 400. In a second example, the controller 480 may cause the transmitter 420 of the LIDAR device 404 to emit the light beams 424. In a third example, the controller 480 may operate actuator 412 to position one or more of the light filters 408 between the LIDAR device 404 and the camera 406. In a fourth example, the controller 480 may operate the camera 406 to obtain an image of the light beams 424 and one or more images of the detectors 432 in line with the discussion above. In a fifth example, the controller 480 may operate the alignment apparatus 460 to adjust the mounting position of the transmitter 420 and/or the receiver 430 in the LIDAR device 404. In a sixth example, the controller 480 may operate the alignment apparatus 460 to mount (or unmount) various components of the system 400 (e.g., LIDAR device 404, etc.) to the mounting platform 402. In a seventh example, the controller 480 may operate the auxiliary light source 470 to illuminate the receiver 430 with light 474. In an eighth example, the controller 480 may operate the display 464 to display an indication of the alignment offsets between the transmitter 420 and the receiver 430. Other examples are possible.

The system 400 may include additional, fewer, or different components than those shown, and may perform other functions as well, in accordance with the present disclosure.

Figure 5:
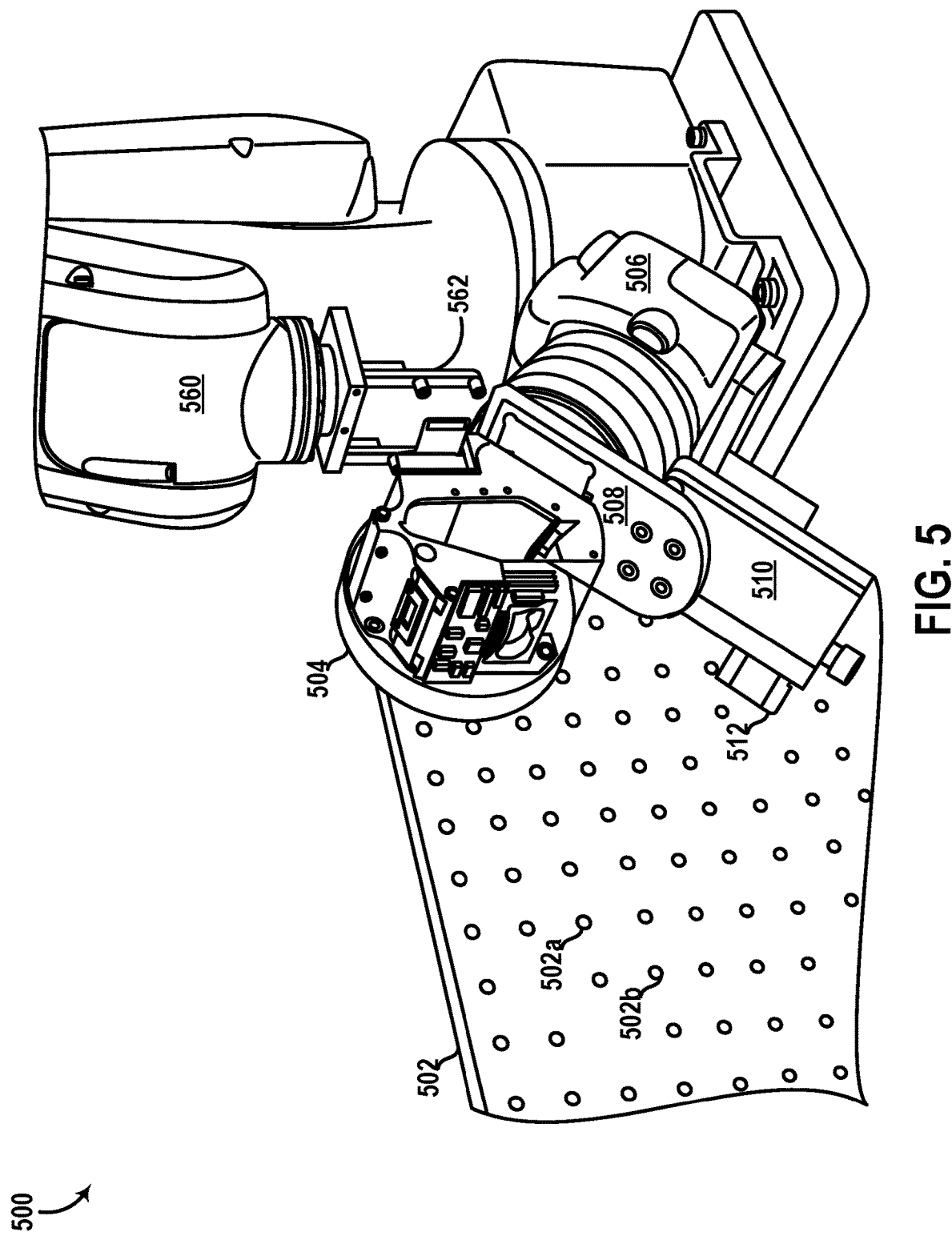
FIG. 5 illustrates another system, according to an example embodiment.

FIG. 5 illustrates a system 500, according to an example embodiment. The system 500 may be similar to the system 400. For example, as shown, the system 500 includes a mounting platform 502, a LIDAR device 504, a camera 506, a light filter 508, and an alignment apparatus 560 that can be similar, respectively, to the mounting platform 402, the LIDAR device 404, the camera 406, the light filter 408, and the alignment apparatus 460 of the system 400. As shown, the system 500 also includes a mounting structure 510, an actuator 512, and a manipulator 562.

The mounting structure 510 may be formed from any solid material (e.g., metal, plastic, etc.) similarly to the mounting platform 502, and may be shaped to facilitate coupling one or more of the components of the system 500 to the mounting platform 502. As shown, for example, the mounting structure 510 couples the camera 506 and the light filter 508 to the mounting platform 502. However, in some examples, a separate mounting structure may be utilized for each of the camera 506 and the light filter 508. Further, in some examples, one or more additional mounting structures (not shown) can alternatively couple the LIDAR device 504 to the mounting platform 502.

The actuator 512 may be configured to adjust a position of the light filter 508. Example actuators may include motors, stepper motors, pneumatic actuators, hydraulic pistons, relays, solenoids, and piezoelectric actuators among other possibilities.

The manipulator 562 may include any structure configured to couple the alignment apparatus 502 with one or more components of the LIDAR device 504. In line with the discussion above, the system 500 may adjust a mounting position of a transmitter (not shown) and/or a receiver (not shown) in the LIDAR device 504. For instance, the alignment apparatus 560 (e.g., robotic arm, etc.) may adjust the relative position between the transmitter and the receiver by adjusting the position of the manipulator 562 or changing the orientation of the manipulator 562, among other possibilities.

As shown, the mounting platform 502 includes a plurality of holes, exemplified by holes 502a and 502b. In some embodiments, one or more components of the system 500, such as the LIDAR device 504, the camera 506, and/or the light filter 508 for instance, may be mounted to the mounting platform 502 by coupling the various components to such holes in the mounting platform (e.g., by fastening a bolt through the holes). In other embodiments, the various components may be mounted to the mounting platform 502 via other processes or devices (e.g., intermediate support structures, etc.). In one example, the various components may be mounted to the mounting platform 502 via an application of an adhesive among other possibilities. In another example, another mounting structure (not shown) may couple one or more of the components to the mounting platform 502. For instance, as shown in FIG. 5, the mounting structure 510 may be coupled to the mounting platform 502 (e.g., by fastening a bolt to one of the holes, etc.), and may also be coupled to the camera 506 and the light filter 508 to provide the particular positions of the camera 506 and the light filter 508 relative to the mounting platform 502. Other configurations and shapes of the mounting structure 510 are possible.

Further, as shown, the LIDAR device 504 has a configuration similar to the LIDAR device 100. However, in some examples, other configurations are possible for the LIDAR device 504.

An example scenario for operation of the system 500 is as follows. First, as shown, the LIDAR device 504 may be mounted to the mounting platform 502 to have a field-of-view (FOV) through which light emitted by a transmitter (not shown) of the LIDAR device 504 and light received by a receiver (not shown) of the LIDAR device 504 propagates. For instance, the LIDAR device 504 may be mounted to the mounting platform 502 using the alignment apparatus 560 (e.g., robotic arm, etc.) or any other device (e.g., mechanical tool, etc.). Next, the camera 506 may be located at a given position relative to the LIDAR device 504 such that the camera 506 may obtain images of the receiver (not shown) of the LIDAR device 504 and/or light emitted by the transmitter (not shown) of the LIDAR device 504.

Continuing with the scenario, the camera 506 may then be focused to infinity for the source wavelength (e.g., 905 nm) of the light emitted by the LIDAR device 504. Next, the light filter 508 may be positioned at a first position to be interposed between the LIDAR device 504 and the camera 506 along the FOV of the LIDAR device 504. For instance, the actuator 512 may be configured to move the light filter 508 to the first position shown in FIG. 5.

Continuing with the scenario, the system 500 may then cause the transmitter (not shown) of the LIDAR device 504 to emit one or more light beams through the light filter 508 and toward the camera 506. Referring back to FIG. 1B by way of example, the light beams may correspond to the light beams 104a-c propagating out of the lens 150. Next, the camera 506 may obtain a first image of the light beams emitted by the LIDAR device 504. Continuing with the example of FIG. 1B, the first image may indicate light source positions of light sources 122a-c in the LIDAR device 100. At this point in the scenario, the system may then cause the LIDAR device 504 to stop emitting the light beams.

Continuing with the scenario, the system may then cause the actuator 512 to move the light filter 508 to a second position where the light filter 508 is not interposed between the camera 506 and the LIDAR 504. In turn, the camera 506 may obtain a second image. The second image may indicate detector positions of detectors in a receiver (not shown) of the LIDAR device 504. Referring back to FIG. 1B by way of example, the second image may represent the detector positions of detectors 132a-c that are viewable to the camera 506 via mirror 142 and lens 150.

Continuing with the scenario, the system 500 may then determine at least one offset based on the first image and the second image. In one instance, the at least one offset may include distances between adjacent light sources and/or adjacent detectors of the LIDAR device 504. In another instance, the at least one offset may include distances between light beams emitted by light sources in the LIDAR device 504 and corresponding detectors of the LIDAR device 504. Other offsets are possible as well.

In the scenario, the alignment apparatus 560 (e.g., robotic arm, etc.) may couple to the transmitter (not shown) and/or the receiver (not shown) of the LIDAR device 504 via the manipulator 562, or via one or more other manipulators (not shown). The alignment apparatus 560 may then adjust the relative position between the transmitter and the receiver in accordance with the determined at least one or more offset.

The transmitter and/or the receiver of the LIDAR device 504 may have six degrees of freedom (DOF). Three of the six DOF are translational: forward/backward (e.g., linearly along a z-axis that extends through the LIDAR device 504 and the camera 506), up/down (e.g., linearly along y-axis perpendicular to the z-axis), and left/right (e.g., linearly along an x-axis perpendicular to the z-axis and the y-axis). Further, three of the six DOF are rotational: pitch (e.g., rotation about the x-axis), yaw (e.g., rotation about the y-axis), and roll (e.g., rotation about the z-axis).

Thus, continuing with the scenario, the system 500 may adjust the mounting position of the transmitter and/or receiver in the LIDAR device 504 by adjusting the forward/backward position, the up/down position, the left/right position, the pitch, the yaw, and/or the roll thereof in line with the discussion above. Through this process, for example, the system 500 may align one or more light sources in the transmitter of the LIDAR device 504 with one or more corresponding detectors in the receiver of the LIDAR device 504.

In some embodiments, the system 500 may then decouple the manipulator 562 from the LIDAR device 504, and the transmitter / receiver arrangement in the LIDAR device 504 may be configured to remain at the alignment (e.g., relative position) performed by the alignment apparatus 560. By way of example, the system 500 may apply an epoxy or other adhesive to maintain the transmitter and/or receiver of the LIDAR device 504 at the respective aligned relative mounting position(s). In one implementation, the manipulator 562 may remain coupled to the LIDAR device 504 until the adhesive is cured. However, other processes are possible as well for maintaining the relative position between the transmitter and the receiver of the LIDAR device 504. For instance, the transmitter and/or receiver of the LIDAR device 504 may be fastened to a housing of the LIDAR device 504 using bolts, screws, among other possibilities.

It is noted that the scenario presented above is for exemplary purposes only. Other scenarios are possible as well that may include some or all of the components of the system 500, or may include additional or fewer processes than those described. A non-exhaustive list of example variations of the scenario is presented below.

In a first example, the system 500 may not include the light filter 508. For instance, the camera 506 may be configured to obtain the first image and the second image without the light filter 508 being interposed between the camera 506 and the LIDAR device 504.

In a second example, the camera 506 and the light filter 508 may be mounted separately from the LIDAR device 504. For instance, the system 500 may be implemented in an assembly line where multiple LIDAR devices such as the LIDAR device 504 are located on an assembly belt. In this instance, the camera 506, the light filter 508 and the robotic arm 560 may be mounted independently adjacent to the assembly belt, and may perform similar functions to the scenario described above to calibrate each LIDAR device in the assembly line.

In a third example, a receiver of the LIDAR device 504 (e.g., similar to receiver 430, etc.) may be illuminated by an auxiliary light source (not shown) similar to the auxiliary light source 470. For instance, the light filter 508 may remain interposed between the LIDAR device 504 and the camera 506 while the first image of the laser beams emitted by the LIDAR device 504 is captured by the camera 506, and while the second image of the receiver is captured as well. In this instance, the receiver of the LIDAR device 504 would be visible to the camera 506 through the light filter 508 due to the illumination by the auxiliary light source with light at the source wavelength that is viewable through the light filter 508.

In a fourth example, the LIDAR device 504 may be configured to continue emitting light while the camera 506 captures the first image and the second image. For instance, the light filter 508 may alternatively or additionally attenuate the light beams having the source wavelength emitted by light sources of the LIDAR device 504.

In a fifth example, the camera 506 may be configured to capture a single image instead of the first image and the second image. The single image may be indicative of both the light source positions of light sources in the LIDAR device 504, and the detector positions of detectors in the LIDAR device 504. Referring back to FIG. 1B by way of example, the single image may capture both the light beams 104a-c and light reflected off the detectors 132a-c. As in the third example above, a receiver of the LIDAR device 504 may be illuminated by an auxiliary light source such that detectors therein are viewable through the light filter 508.

In a sixth example, the light filter 508 (and/or the mounting structure 510) can be replaced by an aperture selector (not shown) that is actuated (e.g., via actuator 512) to interpose one of a plurality of light filters between the camera 506 and the LIDAR device 504, in line with the description of the system 400. For example, each light filter may define a different aperture at a different position. In turn, multiple images obtained by the camera 506 using different apertures may exhibit different distortions due to the associated apertures. Thus, the system 500 may determine alignment offsets between the light sources and the light detectors in the LIDAR device 504 based on such distortions.

Figure 6A:
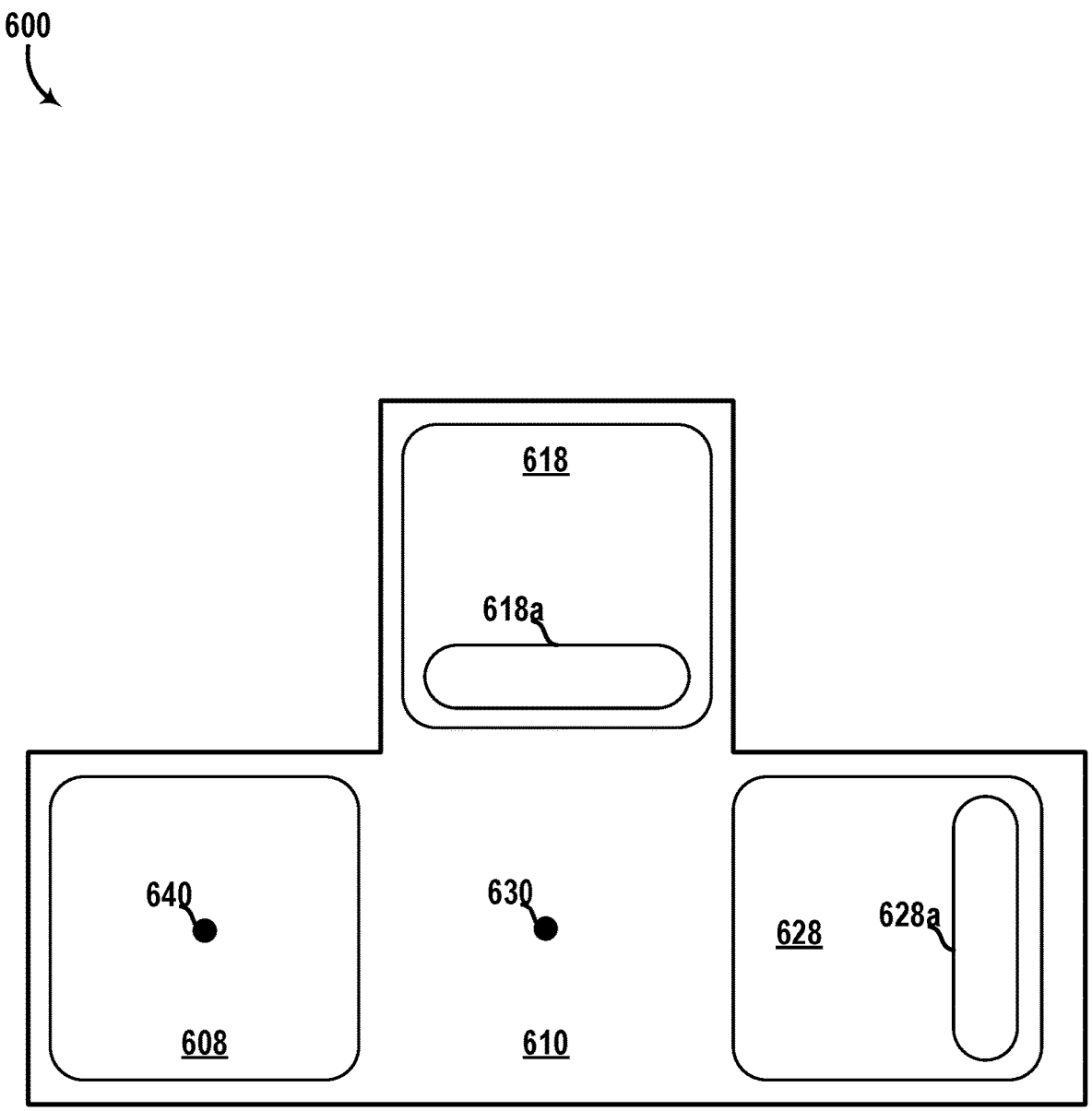
FIG. 6A illustrates an aperture selector in a first configuration, according to an example embodiment.

FIG. 6A illustrates an aperture selector 600 in a first configuration, according to an example embodiment. In some examples, the aperture selector 600 can be used with the system 500 instead of or in addition to the light filter 508. As shown, the selector 600 includes a rotatable structure 610 that includes a plurality of windows 608, 618, and 628 in a particular arrangement with respect to one another. The rotatable structure 610 may be similar to the rotatable structure 410 of the system 400, for example.

Accordingly, the windows 608, 618, 620 may comprise one or more light filters (and/or apertures) similar to the one or more light filters / apertures 408. To that end, the rotatable structure 610 can be actuated (e.g., via actuator 412 or 512) to a particular configuration associated with one of the windows 608, 618, 628 being interposed between the LIDAR device 404 and the camera 406. To facilitate this, for instance, the actuator (412 or 512) may be configured to rotate the rotatable structure 610 about an axis 630 (pointing out of the page).

As a variation of the scenario described in FIG. 5 for example, the first configuration shown in FIG. 6A may correspond to an orientation of the rotatable structure 610 (about axis 630) associated with the window 608 being interposed between the LIDAR device 504 and the camera 506. For instance, in the first configuration shown, an axis 640 (pointing out of the page) that extends through the LIDAR 504 and the camera 506 may intersect window 608. In one implementation, the axis 640 may correspond to an optical axis of the camera 506. In this scenario, a transmitter of the LIDAR 504 may emit light while the selector 600 is in the first configuration (shown) through the window 608 toward the camera 506. While the LIDAR 504 is emitting the light, the camera 506 may then capture an image indicating light source positions of light sources included in a transmitter of the LIDAR device 504.

To facilitate this, in one example, the window 608 may comprise a light filter (e.g., light filter(s) 408, 508, etc.) that attenuates light in a wavelength range that includes a source wavelength of the light emitted by the light sources of the LIDAR 504. By doing so, for instance, the light filter 608 may prevent damage to the camera 506 due to the high intensity of the light emitted by the transmitter of the LIDAR 504. In another example, window 608 may alternatively comprise a cavity (e.g., hole, opening, etc.) that allows the emitted light to propagate through the selector 600 toward the camera 506. Other examples are possible as well.

Next, in the scenario, selector 600 can be adjusted to a second configuration where the window 618 is interposed between the LIDAR 504 and the camera 506. For example, the actuator (412 or 512) may rotate the rotatable structure 610 about the axis 630 to the second configuration where the axis 640 intersects the window 618 instead of the window 608.

Figure 6B:
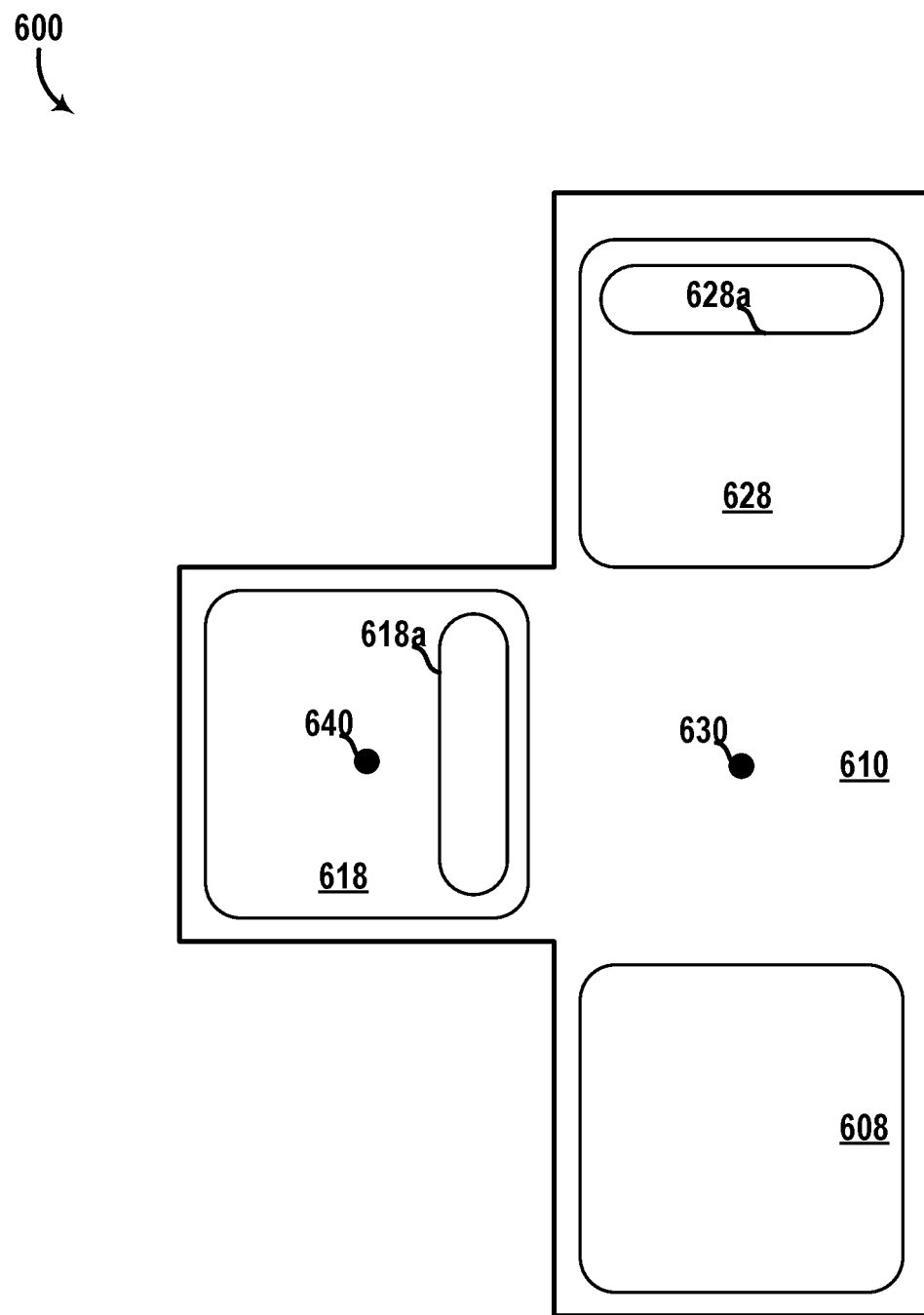
FIG. 6B illustrates the aperture selector of FIG. 6A in a second configuration.

FIG. 6B illustrates the selector 600 in the second configuration. As shown, for instance, the window 618 may comprise a light filter that defines a first aperture 618a at a first position relative to the axis 640 (and the camera 506). The first aperture 618a, for instance, may correspond to a region of the light filter 618 that has different light transmission characteristics than other (e.g., adjacent) regions of the light filter 618. In one example, the region 618a may correspond to a cavity (e.g., hole, opening, slit, etc.) within an opaque material of the light filter 618. In another example, alternatively to the opaque material, the regions of the light filter 618 adjacent to the aperture 618a may have material characteristics that attenuate light having the source wavelength of the light emitted by the LIDAR 504 (and/or the auxiliary light source 470).

Continuing with the scenario, while the selector 600 is at the second configuration of FIG. 6B for instance, the auxiliary light source 470 may illuminate a receiver (e.g., 430) of the LIDAR device (e.g., 404, 504, etc.) at the source wavelength. The illuminated receiver can then be imaged by the camera 506 through the aperture 618. Thus, the camera 506 can capture another image indicating distorted positions of the light detectors in the LIDAR device 504. For instance, due to the offset position of the aperture 618a relative to the optical axis 640 of the camera 506, light propagating from light detectors closer to the aperture 618a may be focused differently than light propagating from light detectors further from the aperture 618a.

Next, in the scenario, selector 600 can be adjusted to a third configuration where the window 628 is interposed between the LIDAR 504 and the camera 506. For example, the actuator (412 or 512) may rotate the rotatable structure 610 about the axis 630 to the third configuration where the axis 640 intersects the window 628 instead of the window 618.

Figure 6C:
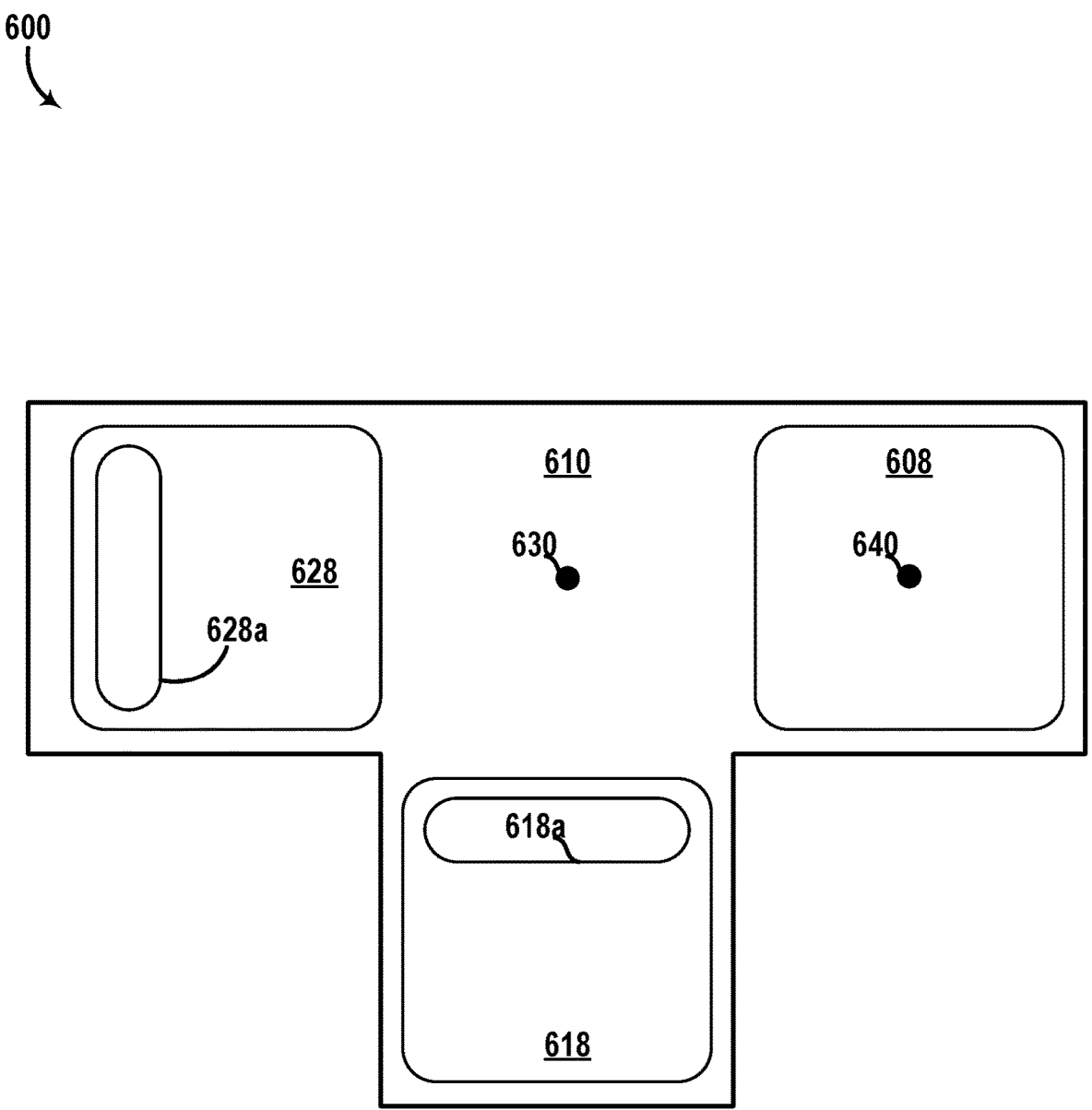
FIG. 6C illustrates the aperture selector of FIG. 6A in a third configuration.

FIG. 6C illustrates the selector 600 in the third configuration. As shown, for instance, the window 628 may comprise a light filter that defines a second aperture 628a at a first position relative to the axis 640 (and the camera 506). The second aperture 628a, for instance, may correspond to a region of the light filter 628 that has different light transmission characteristics than other (e.g., adjacent) regions of the light filter 628. In one example, the region 628a may correspond to a cavity (e.g., hole, opening, slit, etc.) within an opaque material of the light filter 628. In another example, alternatively to the opaque material, the regions of the light filter 628 adjacent to the aperture 628a may have material characteristics that attenuate light having the source wavelength of the light emitted by the LIDAR 504 (and/or the auxiliary light source 470).

Continuing with the scenario, while the selector 600 is at the third configuration of FIG. 6C, the auxiliary light source 470 may illuminate a receiver (e.g., 430) of the LIDAR device (e.g., 404, 504, etc.). The illuminated receiver can then be imaged by the camera 506 through the aperture 628. Thus, the camera 506 can capture yet another image indicating different distorted positions of the light detectors in the LIDAR device 504. For instance, due to the different offset position of the aperture 628a relative to the optical axis 640 of the camera 506 (compared to the position of aperture 618a shown in FIG. 6B), light propagating from light detectors closer to the aperture 628a may be focused differently than light propagating from light detectors further from the aperture 628a.

Next, in the scenario, the system 500 can compare the images captured according to the configurations of FIGS. 6A, 6B, 6C to determine alignment offsets between the transmitter and receiver of the LIDAR device. For instance, the difference between distortions due to apertures 618a and 628a may vary for each detector depending on whether the detector is positioned closer or further from the camera 506. Thus, in one example, a depth misalignment may be associated with an extent of overlap between detector positions in the distorted images (obtained through apertures 618a and 628a) and the light source positions in the image of the emitted light beams (obtained via light filter 608). In another example, horizontal, vertical, roll, pitch, and/or yaw misalignments can also be determined based on the difference between offset detector positions indicated in the images obtained via apertures 618a and 628a. Other examples are possible as well and are described in greater detail within exemplary embodiments herein.

It is noted that the shape, structure, and size of the aperture selector 600 and/or components thereof shown in FIGS. 6A-6C are illustrated as shown only for the sake of example, and are not necessarily to scale. Other configurations of the aperture selector 600 are possible as well. For example, alternatively or additionally to the rotatable structure 610, the selector 600 may comprise a collection of light filters (or windows), such as in a stack arrangement for instance, and the selector 600 may actuate a respective one of the light filters to be interposed between the LIDAR 504 and the camera 506 for capturing a corresponding image. As another example, the apertures 618a, 628b may have different shapes (e.g., circular, etc.) than the shapes shown. Other examples are possible as well.

Further, although the selector 600 is shown to include three windows 608, 618, 628, in some examples, the selector 600 may include fewer or more windows. For example, another window (not shown), may include an aperture that is substantially perpendicular to apertures 618a, 628a when the other window is interposed between the LIDAR 504 and the camera 506. Other examples as possible as well.

III. Example Methods and Computer Readable Media

Figure 7:
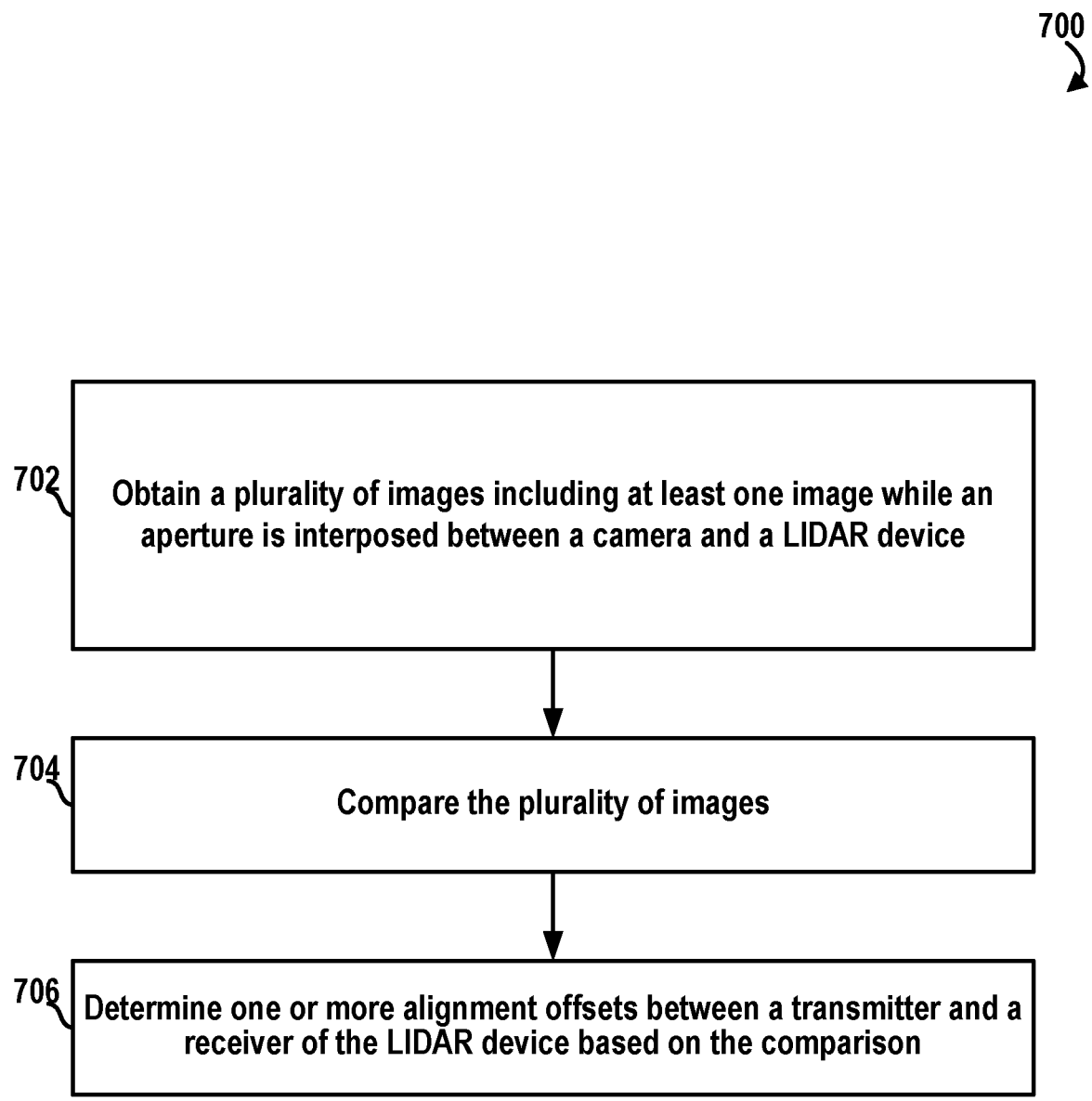
FIG. 7 is a flowchart of a method, according to an example embodiment.

FIG. 7 is a flowchart of a method 700, according to an example embodiment. Method 700 shown in FIG. 7 presents an embodiment of a method that could be used with any of the devices 100, 220, 330, the systems 400, 500 and/or the aperture selector 600, for example. Method 700 may include one or more operations, functions, or actions as illustrated by one or more of blocks 702-706. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 700 and other processes and methods disclosed herein, each block in FIG. 7 may represent circuitry that is wired to perform the specific logical functions in the process.

At block 702, the method 700 involves obtaining a plurality of images using a camera located at a given position relative to a LIDAR device. The plurality of images may include a first image obtained while a first aperture is interposed between the camera and the LIDAR device, and a second image obtained while a second aperture is interposed between the camera and the LIDAR device.

For example, the system 500 may obtain a plurality of images using the camera 506 located at the given position (shown in FIG. 5) relative to the LIDAR device 504. Further, the first image may correspond to an image captured while the first aperture 618a is interposed between the camera 506 and the LIDAR 504, and the second image may correspond to an image captured while the second aperture 628a is interposed between the camera 506 and the LIDAR 504, in line with the discussion above. However, in some embodiments, the second image may correspond to an image captured while none of the first or second apertures is interposed between the camera and the LIDAR. For example, the plurality of images may alternatively include only one image where an aperture is interposed between the camera and the LIDAR device, and one or more images captured without an aperture being interposed between the camera and the LIDAR device.

In some implementations, the method 700 may involve locating the camera at the given position at which the camera can image light beams emitted by the one or more light sources and can image the one or more detectors. By way of example, the given position may be similar to the position of the camera 506 of the system 500. For instance, a field-of-view of the camera may be aligned with a FOV of the LIDAR device where light emitted from the one or more light sources propagates away from the LIDAR device.

Further, in some examples, the LIDAR device may include a transmitter (e.g., transmitter 420) comprising one or more light sources (e.g., light sources 422), and a receiver (e.g., receiver 430) comprising one or more light detectors (e.g., detectors 432).

To that end, in some implementations, the method 700 may involve mounting a transmitter and a receiver in a light detection and ranging (LIDAR) device to provide a relative position between the transmitter and the receiver. Further, in some instances, the transmitter may include one or more light sources configured to emit light at a source wavelength, and the receiver may include one or more detectors configured to detect light at the source wavelength. In one embodiment, the source wavelength is 905 nm. In other embodiments, the source wavelength may be any other wavelength (e.g., infrared, ultraviolet, x-ray, visible, etc.).

In one example, the transmitter and the receiver may be mounted by a robotic arm (e.g., alignment apparatuses 460, 560, etc.) into a housing (e.g., housing 110, etc.) of the LIDAR device to provide the relative position. For instance, the relative position may relate to the mounting positions of transmitter 120 and receiver 130 of FIG. 1B. In another example, the mounting of the transmitter and receiver may be performed by a device other than the alignment apparatus 460 or 560. For instance, the mounting may correspond to an alignment (e.g., adjustment of the relative position) by a system performing the method 700 for a transmitter and a receiver that are already mounted in a LIDAR device.

In some examples, the LIDAR device may also include a lens configured to (i) direct or collimate light emitted from the one or more light sources and (ii) focus light propagating toward the LIDAR device onto the one or more detectors, similarly to the lens 150 for instance. In other examples, the LIDAR device may include a transmit lens for collimation/direction of emitted light and a receive lens for focusing received light.

In some examples, the first image obtained at block 702 (while the first aperture is interposed between the camera and the LIDAR device) may be indicative of first detector positions of the one or more light detectors in the receiver, and the second image may be indicative of second detector positions of the one or more light detectors in the receiver. Referring back to FIG. 1B by way of example, the first image (and/or the second image) may represent the detectors 132a-c that are viewable to the camera via the lens 150 and the mirror 142.

Further, in line with the discussion above, the first detector positions indicated by the first image may be offset (e.g., distorted) based on the first position of the first aperture. For example, where the first aperture corresponds to the aperture 618a of FIG. 6B, the first image may be distorted in a particular direction along a line that extends through the aperture 618a and the camera axis 640. Thus, for instance, the first detector positions in the first image may be distorted (e.g., shifted, etc.) along the direction of distortion caused by the first aperture.

Similarly, the second detector positions indicated by the second image may be offset (e.g., distorted) based on the second position of the second aperture. As shown in FIGS. 6B and 6C for instance, the apertures 618a and 628a (when interposed between the camera and the LIDAR) are symmetrically arranged relative to the axis 640. Thus, where the second aperture corresponds to the aperture 628a of FIG. 6C for example, the second image may be distorted in an opposite direction (compared to the first image) along the line that extends through aperture 628a and the camera axis 640.

In some implementations, the method 700 may involve obtaining the first image (and/or second image) while the one or more light sources (of the LIDAR transmitter) are not emitting light at the source wavelength (of the light emitted by the LIDAR transmitter). For instance, system 400 may reduce power to the one or more light sources 422 and/or provide instructions to the LIDAR device 404 to stop emitting light beams 424 while the camera 406 is capturing the first image (and/or the second image).

However, in other implementations, the method 700 may involve obtaining the first image (and/or the second image) while the one or more light sources are emitting the light at the source wavelength. For instance, a light filter (e.g., light filters 618, 628) may be interposed between the camera and the LIDAR device while the camera is capturing the first image (and/or the second image), and the light filter may be configured to attenuate light at the source wavelength emitted by the one or more light sources. In this instance, the system performing the method 700 may then obtain the first image (and/or the second image) while the light filter attenuates the light beams (e.g., beams 424) emitted by the one or more light sources.

In some implementations, the method 700 may involve obtaining the first image (and/or the second image) while the one or more detectors are illuminated with light at the source wavelength from an auxiliary light source (e.g., auxiliary light source 460). In one example, the camera may be focused at infinity for the source wavelength. In another example, a light filter interposed between the camera and the LIDAR device may be configured to attenuate light having wavelengths other than the source wavelength. In both examples, the auxiliary light source may illuminate the one or more detectors such that reflections of the illuminating light having the source wavelength are viewable by the camera when capturing the first image (and/or the second image). Accordingly, in some examples, the method 700 may involve causing (e.g., by controller 480) an auxiliary light source to illuminate the receiver (of the LIDAR device) with light having a source wavelength of light emitted by the transmitter (of the LIDAR device), and obtaining the first image (and/or the second image) while the receiver is illuminated by the auxiliary light source.

In some implementations, the method 700 may involve obtaining a third image indicative of light source positions of the one or more light sources in the LIDAR device. The third image, for example, may be obtained using the camera located at the given position (and optionally while the camera is focused at infinity). Referring back to FIG. 1B by way of example, the light source positions of the light sources 122*a*-*c* may vary according to the particular orientation and position of the transmitter 120. In turn, the direction of propagation of the light beams 104*a*-*c* may also vary, and such variation may be represented by pixels in the third image obtained by the camera.

In some implementations, the method 700 may involve obtaining the third image while the one or more light sources are emitting light at the source wavelength. For instance, the system 400 may provide power and/or instructions to the LIDAR device 404 to emit the light at the source wavelength, and may provide instructions to the camera 406 to capture the third image while the one or more light sources are emitting the light. Further, in some instances, the system may provide instructions to the camera to adjust its focus to infinity for the source wavelength. Alternatively, for instance, the camera may be configured to have the focus prior to capturing the third image.

In some implementations, the method 700 may involve obtaining the third image while a light filter is interposed between the camera and the one or more light sources of the LIDAR device. For instance, the light filter may be similar to the light filters 408, 508, 608, 618, 628, etc. In one example, the light filter may be configured to attenuate light having wavelengths other than the source wavelength of emitted light (e.g., beams 424) from light sources in the LIDAR device. In this example, the third image may be more suitable for representing features of the emitted light beams at the source wavelength relative to other sources of light (e.g., background light, etc.). In another example, the light filter may additionally or alternatively be configured to attenuate light within a wavelength range that includes the source wavelength. In this example, the light filter may reduce the intensity of the emitted light to protect components of the camera. Further, in this example, the light filter may reduce an amount of light propagating toward the camera that has wavelengths proximal to the source wavelength. In turn, for instance, pixels in the third image representing the emitted light beams having the source wavelength may be easily contrasted from surrounding pixels having proximal wavelengths.

In some implementations, the method 700 may involve causing an actuator to position at least one filter of a plurality of light filters. The plurality of filters could include, for example, a first light filter that has a first region corresponding to a first aperture and a second light filter that has a second region corresponding to a second aperture. In one approach, the system 400 may cause the actuator 412 to manipulate an aperture selector, such as selector 600 for instance, thereby causing one of the plurality of light filters to be interposed between the LIDAR device and the camera. For example, prior to obtaining the first image at block 702, the actuator 412 may rotate the rotatable structure 610 about the axis 630 until the first light filter 618 having the first aperture 618*a* is interposed between the camera and the LIDAR device (as shown in FIG. 6B). In this example, prior to obtaining the second image at block 702, the actuator 412 may rotate the rotatable structure 610 until the second light filter 628 having the second aperture 628*a* is interposed between the camera and the LIDAR device.

Accordingly, in some implementations, causing the actuator to position at least one light filter of the plurality of light filters involves, prior to obtaining the first image, causing the actuator to arrange the plurality of light filters according to a first configuration (e.g., configuration of FIG. 6B) associated with the first light filter (e.g., light filter 618) being interposed between the camera and the LIDAR device. In these implementations, causing the actuator to position at least one light filter of the plurality of light filters also involves, prior to obtaining the second image, causing the actuator to arrange the plurality of light filters according to a second configuration (e.g., configuration of FIG. 6C) associated with the second light filter being interposed between the camera and the LIDAR device.

At block 704, the method 700 involves comparing the plurality of images. For example, the first image may indicate first detector positions of the one or more light detectors in the LIDAR receiver, and the second image may indicate second detector positions of the one or more light detectors. Accordingly, in some implementations, the comparison at block 704 may involve comparing the first detector positions indicated by the first image to the second detector positions indicated by the second image.

Further, in some implementations, comparing the first detector positions to the second detector positions may involve comparing locations of one or more image pixels associated with a given light detector in the first image to locations of one or more corresponding image pixels associated with the given light detector in the second image. In the scenario of FIGS. 6B-6C for instance, where the first aperture 618a and the second aperture 628a are configured to be at opposite directions from the camera axis 640 (while respectively interposed between the camera and the LIDAR), the difference between a first detector position of a particular light detector and a second detector position of the particular light detector may indicate a depth offset (e.g., how far the particular detector is from the camera), a translational offset (e.g., along an axis that extends between the two apertures 618a, 628a), or a rotational offset (e.g., roll, pitch, yaw, etc.).

Further, in some examples, the third image (e.g., obtained while window 608 is interposed between the camera and the LIDAR in the scenario of FIG. 6A) indicates light source positions of the one or more light sources in the LIDAR transmitter. Accordingly, in some implementations, the comparison at block 704 may also involve comparing the first detector positions indicated by the second image, the second detector positions indicated by the second image, and the light source positions indicated in the third image. In the scenario of FIGS. 6A-6C for instance, an extent of overlap between the first detector position (of a particular light detector), the second detector position (of the particular light detector), and a light source position (of a corresponding light source) may indicate a depth offset (e.g., along axis 640) of the particular light detector relative to the corresponding light source.

In some examples, the one or more light detectors of the receiver in the LIDAR device may comprise one or more avalanche photodiodes (APDs). The APDs may have a characteristic of emitting light when connected to power according to a first voltage bias configuration (e.g., first direction of current flowing through the APDs) and detecting light when connected to the power according to a second voltage bias configuration (e.g., opposite direction of current flowing through the APDs). Thus, in some implementations, the method 700 may involve, while obtaining the first image (and/or the second image), causing the one or more APDs to operate according to a given voltage bias configuration that causes the one or more APDs to emit light. By doing so, for instance, pixels in the first image (and/or second image) associated with detector positions may be more accurately contrasted against surrounding pixels. As a result, for instance, detector positions in the first image (and/or the second image) can be estimated more accurately by an example system (e.g., the system 400, etc.) that compares the plurality of images at block 704.

At block 706, the method 700 involves determining one or more alignment offsets between the transmitter and the receiver of the LIDAR device based on the comparison. In line with the discussion above, for example, a system of the method 700 may determine the one or more alignment offsets at block 706 based on a comparison of pixel locations (indicated in the first, second, and/or third images) associated with a particular light detector and a corresponding light source.

In some implementations, the method 700 may involve determining at least one distance offset based on the light source positions (indicated by the third image) and the detector positions (indicated by the first image and/or the second image).

In a first example, the at least one distance offset may include distances between adjacent regions of the third image that are associated with particular light sources. In a second example, the at least one offset may include a distance between a first (e.g., distorted) detector position of a particular detector indicated by the first image and a second detector position of the particular detector indicated by the second image. In a third example, the at least one offset may include distances between adjacent regions of the first image (or second image) that are associated with particular detectors. In fourth example, the at least one offset may include an offset between a region of the third image associated with a given light source, and a region of the first image (and/or second image) associated with a corresponding detector.

In these examples, the offset may have a horizontal component and a vertical component, or may just be a distance between the respective regions (e.g., number of pixels).

In some implementations, the method 700 may involve generating a composite image based on overlaying the first image, the second image, and/or the third image. In these examples, the at least one offset may be determined based on separation between one or more pixels in the composite image associated with a light source and one or more pixels in the composite image associated with a corresponding detector. For example, the composite image may include an indication of a light source position (based on pixel(s) in the third image) together with an indication of a first detector position (based on pixel(s) in the first image) and an indication of a second detector position (based on pixel(s) in the second image).

In some implementations, the method 700 may involve providing an indication of the one or more alignment offsets via a display. For example, the system 400 may operate the display 464 to display the composite image or a portion thereof (e.g., displaying an image of a light source overlaid with two circles showing detector positions of a corresponding detector indicated by the respective two images obtained via the two apertures). As another example, the system 400 may display a graphical illustration of the one or more alignment offsets (e.g., a scatter plot or curve indicating a relationship between one or more alignment offsets and a position of a detector in the image(s)). Other examples are possible as well.

In some implementations, the method 700 may involve adjusting a mounting position of the transmitter and/or the receiver in the LIDAR device based on the one or more determined alignment offsets. In one example embodiment, the controller 480 of the system 400 may provide a signal to alignment apparatus 460 that causes the alignment apparatus 460 to adjust the mounting position of the transmitter 420 and/or the receiver 430 in the LIDAR device 404. Accordingly, in some implementations, the method 700 may involve causing (e.g., by the controller 480) an adjustment of a mounting position of at least one of the transmitter or the receiver (of the LIDAR device).

By way of example, a robotic arm or other device (e.g., alignment apparatuses 460, 560, etc.) may couple to the transmitter and/or the receiver to adjust the relative position. The robotic arm, for instance, may translate the coupled component linearly and/or rotate the coupled component about an axis. Accordingly, in some implementations, the method 700 may involve adjusting the relative position between the transmitter and the receiver by rotating the receiver about an axis. Additionally or alternatively, in some implementations, the method 700 may involve adjusting the relative position by rotating the transmitter about an axis.

Adjusting the mounting position of the transmitter and/or the receiver may beneficially reduce the one or more alignment offsets. For instance, where the one or more alignment offsets include an offset between a light source and a corresponding detector, the adjustment of the relative position between the transmitter and the receiver may reduce the offset to align the light source with the detector. In other examples, adjusting the relative position between the transmitter and the receiver causes at least one of the one or more alignment offsets to correspond to a particular offset. For instance, where the one or more alignment offsets includes an offset between two adjacent light sources, the adjustment of the relative position may cause the offset to correspond to the particular offset.

Figure 8:
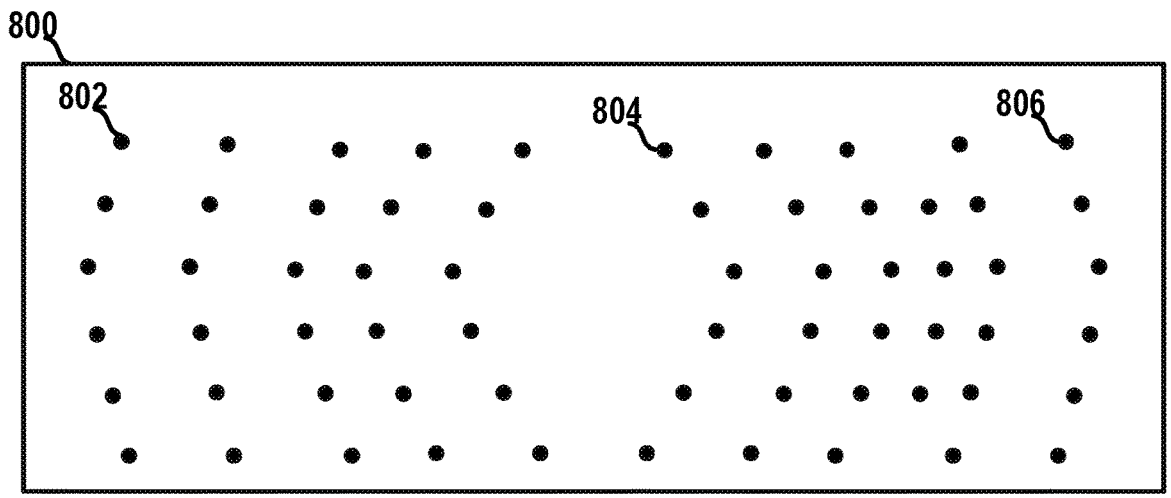
FIG. 8 illustrates an image indicative of light source positions, according to an example embodiment.

FIG. 8 illustrates an image 800 indicative of light source positions of light sources in a transmitter of a LIDAR device, according to an example embodiment. For example, the image 800 may be similar to the third image described at block 702 of the method 700. Referring back to FIG. 2 by way of example, regions 802, 804, 806 shown in the image 800 may correspond, respectively, to light beams 202a, 202b, 202c emitted by light sources 222a, 222b, 222c of the transmitter 220 (or any other light sources of a different LIDAR transmitter configuration).

Figure 9:
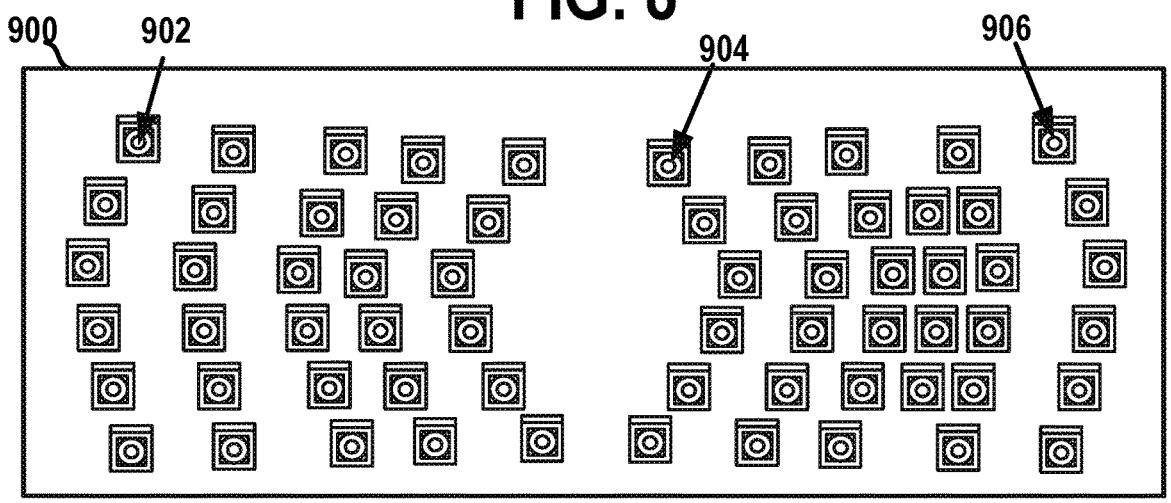
FIG. 9 illustrates an image indicative of distorted detector positions associated with a first aperture, according to an example embodiment.

FIG. 9 illustrates an image 900 indicative of distorted detector positions of light detectors in a receiver of a LIDAR device, according to an example embodiment. For instance, the image 900 may be similar to the first image (e.g., obtained while the first aperture 618a is interposed between the camera and the LIDAR) described at block 702 (e.g., obtained while the first aperture 618a is interposed between the camera and the LIDAR) of the method 700. Referring back to FIG. 3A by way of example, regions 902, 904, 906 of the image 900 may correspond, respectively, to the detectors 332a, 332b, and 332c of the receiver 330 (or any other detectors of a different LIDAR receiver configuration).

Figure 10:
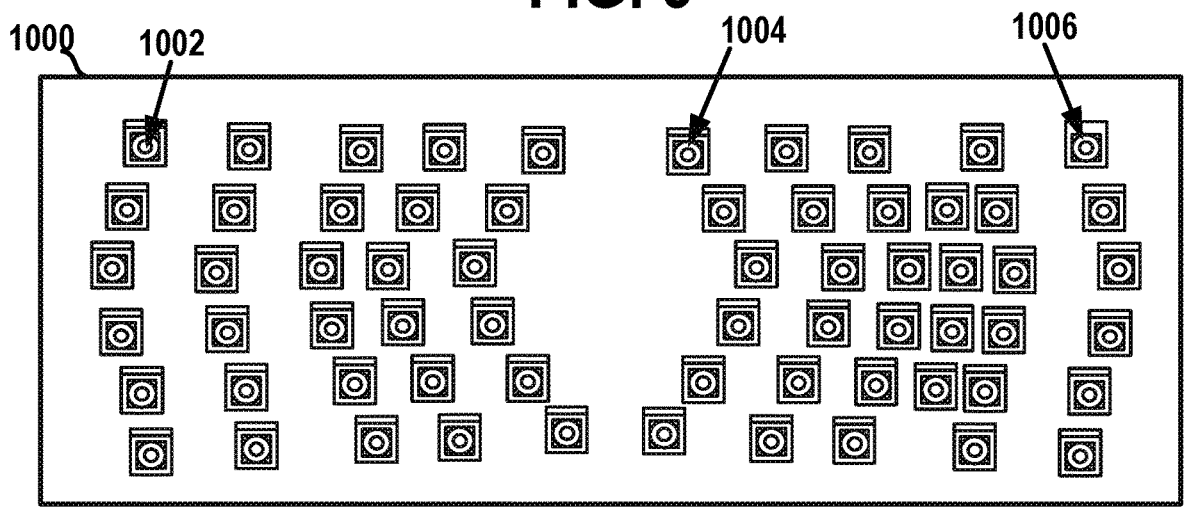
FIG. 10 illustrates an image indicative of distorted detector positions associated with a second aperture, according to an example embodiment.

FIG. 10 illustrates another image 1000 indicative of distorted detector positions of light detectors in a receiver of a LIDAR device, according to an example embodiment. For instance, the image 1000 may be similar to the second image (e.g., obtained while the second aperture 628a is interposed between the camera and the LIDAR) described at block 702 (e.g., obtained while the second aperture 628a is interposed between the camera and the LIDAR) of the method 700. Referring back to FIG. 3A by way of example, regions 1002, 1004, 1006 of the image 1000 may correspond, respectively, to the detectors 332a, 332b, and 332c of the receiver 330 (or any other detectors of a different LIDAR receiver configuration). It is noted that some of the components of a LIDAR receiver (e.g., wiring, PCB surface, etc.) may be omitted from the illustrations of images 900 and 1000 for convenience in description.

In line with the discussion above, pixel locations (and/or sizes, shapes, etc.) of one or more detectors indicated in the image 900 differ from pixel locations of the same one or more detectors indicated in the image 1000. For example, as shown in FIGS. 9 and 10, the pixel positions of the detectors associated with regions 902, 904, 906 of the image 900 are different from the pixel positions of the same detectors associated with regions 1002, 1004, 1006. As noted above, this difference may be based on the distance between the respective detectors and the camera as well as the locations of the respective apertures (e.g., 618a, 628a) through which the images 900, 1000 are captured.

It is noted that the numbers, positions, sizes, and appearances indicated for light sources and/or transmitters as shown in FIGS. 8-10 are only for convenience in description. Thus, in various examples, the numbers, positions, sizes, and appearances may differ from the representations shown in FIGS. 8-10 depending on the particular configuration of an imaged LIDAR device.

Figure 11:
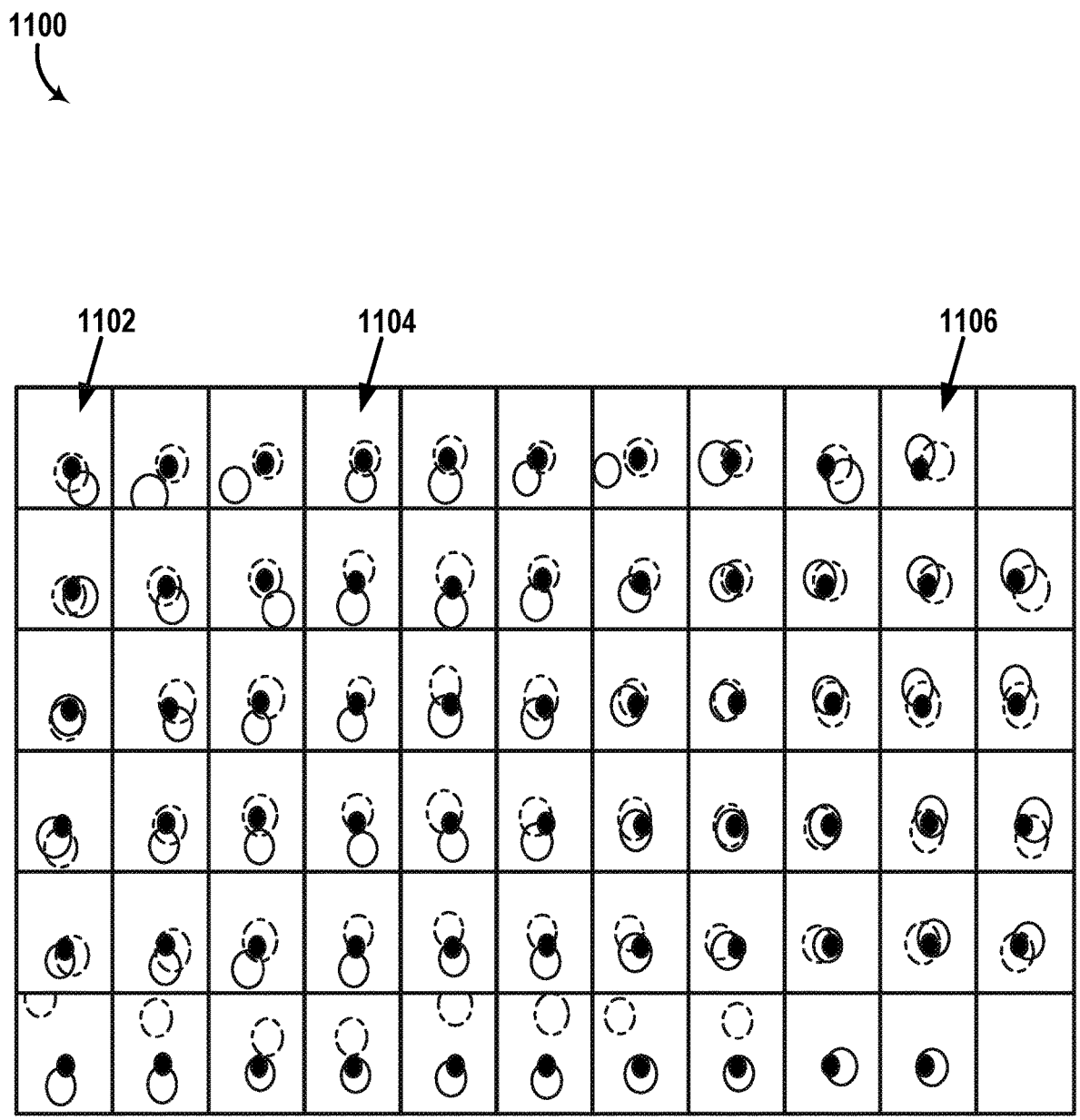
FIG. 11 is a first illustration of alignment offsets determined based on a comparison of a plurality of images, according to an example embodiment.

FIG. 11 is a first illustration 1100 of alignment offsets determined based on a comparison of a plurality of images, according to an example embodiment. In the grid representation of FIG. 11, each grid cell may correspond to a portion of the image 800 encompassing pixel(s) associated with a respective light beam from a respective light source. Additionally, each grid cell in the illustration 1100 is overlaid with an indication (e.g., solid circle/ellipse, etc.) of pixel locations in the image 900 associated with a corresponding detector. Further, each grid cell is also overlaid with an indication (e.g., dashed circle/ellipse, etc.) of pixel locations in the image 1000 associated with the corresponding detector. For example, as shown, grid cell 1102 may be based on the image regions 802, 902, and 1002, grid cell 1104 may be based on the image regions 804, 904, and 1004, and grid cell 1106 may be based on the image regions 806, 906, and 1006.

Referring back to FIG. 9, consider a scenario where a receiver represented by the image 900 has a z-axis extending out of the page, a y-axis that extends in a direction that corresponds to a short side of the image 900 and an x-axis that extends in a direction that corresponds to a long side of the image 900.

Referring back to FIG. 1B by way of example, reflected light beams 108 focused by the lens 150 onto a focal surface along the z-axis of receiver 130 that is closer or further from a current z-position of the receiver 130 (e.g., focal surface 138). In this scenario, depth alignment offsets (along the z-axis) between the transmitter 120 and the receiver 130 can be determined based on the information shown in the illustration 1100. On one hand, as the z-position of the receiver 130 approaches the focal surface defined by the lens 150, the light beam pixels (e.g., regions 802, 804, 806, etc.) would become closer or overlap to a greater extent with the circles (solid) indicating the first detector positions (e.g., regions 902, 904, 906, etc.) in the image 900, as well as the circles (dashed) indicating the second detector positions (e.g., regions 1002, 1004, 1006, etc.) in the image 1000. On the other hand, as the z-position of the receiver 130 (e.g., focal surface 138) moves away from the focal surface defined by the lens 150 (whether in a positive or negative direction on the z-axis), the distances between the two respective circles and the corresponding light source pixels would increase.

Accordingly, in some implementations, an example method (e.g., method 700) may involve determining a number of light detectors having first detector positions (indicated by image 900) and second detector positions (indicated by image 1000) that at least partially overlap respective light source positions (indicated by image 800), and determining one or more depth alignment offsets based on the determined number of light detectors. Alternatively, for example, the example method may involve determining the one or more depth alignment offsets based on a comparison between the determined number of light detectors and a sum of the light detectors indicated in the image 900 or the image 1000. For example, the system 400 may adjust the z-position of the receiver (and/or transmitter) until at least than a threshold number of grid cells in the illustration 1100 match this condition. The threshold, for example, may correspond to 50%, 70%, 90% or any other threshold number of grid cells that match the condition, depending on various design and/or configuration factors associated with the LIDAR device.

In some examples, the grid representation (or a portion thereof) shown in FIG. 11 can be displayed (e.g., via display 464). In other examples, the information represented in the illustration 1100 can be computed and used to operate an alignment apparatus (e.g., 460, 560, etc.) to adjust the mounting position of the associated LIDAR transmitter and/or receiver in line with the discussion above.

Figure 12:
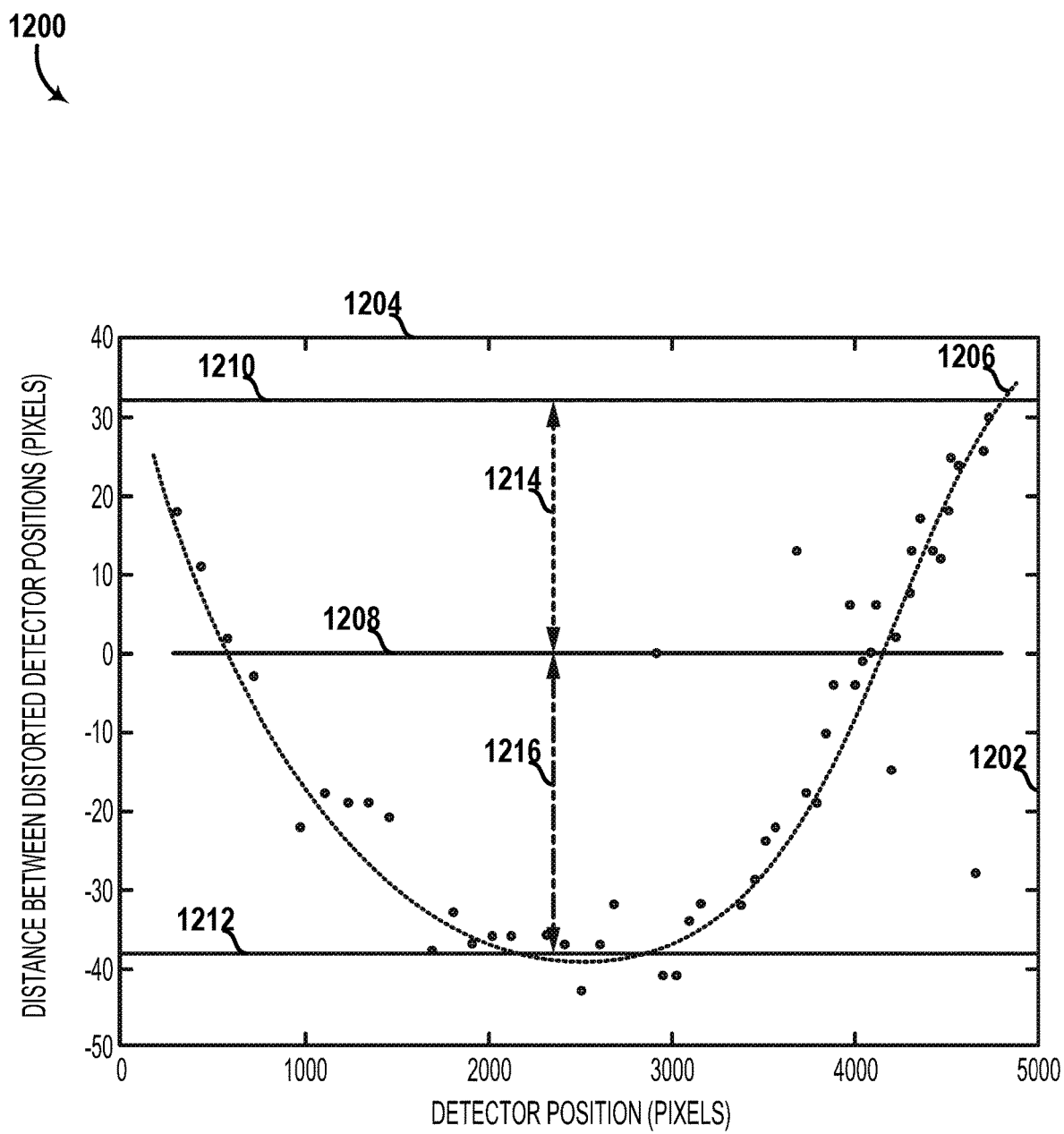
FIG. 12 is a second illustration of alignment offsets determined based on a comparison of a plurality of images, according to an example embodiment.

FIG. 12 is a second illustration 1200 of alignment offsets determined based on a comparison of a plurality of images, according to an example embodiment. The scatter plot representation 1200, for example, may represent the relationship of: (i) a pixel distance between first detector positions indicated in the image 900 (e.g., solid ellipses in the grid 1100) and corresponding second detector positions indicated in the image 1000 (e.g., dashed ellipses of the grid 1100); relative to (ii) a pixel position of the detectors in the images 900 and/or 1000.

A pixel distance (axis 1202), may be a vertical pixel distance (e.g., along short side of images 900, 1000), a horizontal pixel distance (e.g., along long side of images 900, 1000), or a shortest distance (e.g., number of pixels along shortest path between solid and dashed ellipses of illustration 1100), among other possibilities. Further, a pixel position (e.g., axis 1204) may correspond to a horizontal position (e.g., along long side of images 900, 1000), or a vertical position (e.g., along short side of images 900, 1000), among other possibilities.

For the sake of example, the vertical axis 1202 may correspond to a vertical distance between the first and second detector positions, and the horizontal axis 1204 may correspond to the horizontal pixel positions of the detectors in one of the images 900 or 1000. However, other examples are possible.

Fitted curve 1206 (e.g., trend-line, best-fit curve, etc.) shown in FIG. 12 may be based on at least some of the points in the scatter plot 1200 for convenience in description. Referring back to FIG. 3A by way of example, curve 1206 may indicate that detectors near the horizontal ends of the receiver 330 (e.g., detectors 332a and 332c) are associated with a relatively high positive offset along the axis 1202, and detectors near the middle of the receiver 330 (e.g., detector 332b) are associated with a relatively high negative offset along the axis 1202. For example, due to the curved focal surface 138 of the detectors 132a-c in the receiver 130, the detectors near the ends of the receiver 130 (e.g., detectors 332a, 332c of receiver 330) may be relatively closer to the camera that obtained images 900 and 1000. As a result, these detectors may be associated with a high difference between their respective positions in the images 900 and 1000. Similarly, detectors near the center of the receiver 130 (e.g., detector 332b of receiver 330) may also be associated with a high difference between their respective positions in the images 900 and 100. Thus, for example, a focal length (or a multiple thereof) of the camera may correspond to line 1208 associated with a zero-difference between the pixel positions in the images 900 and 1000. However, it is noted that in some examples, the focal surface of the detectors 132a-132c (and/or 332a-332c) may be different (e.g., linear, flat, etc.), and thus the shape of the curve 1206 may also differ.

Further, as shown, line 1210 may represent a maximum threshold pixel distance between detector positions (indicated by fitted curve 1206), and line 1212 may represent a minimum threshold pixel distance (indicated by curve 1206). As shown, the maximum threshold 1210 and the minimum threshold 1212 do not necessarily correspond to the maximum values measured in the scatter plot 1200. For example, as shown, some of the points in the plot 1200 (e.g., points 121 may be omitted from the determination of the thresholds 1210 and 1212.

In an example implementation, the system 400 can determine and/or adjust one or more alignment offsets between mounting positions of the transmitter 420 and the receiver 430 of the LIDAR device 404 based on the information shown in FIG. 12. For instance, a distance 1214 (between lines 1208 and 1210) and/or a distance 1216 (between lines 1208 and 1212) may indicate a misalignment error (e.g., alignment offset) between the transmitter and the receiver in a direction along the y-axis (e.g., short side of images 900, 1000). Thus, an example method may involve adjusting the vertical mounting position (e.g., along y-axis) of the transmitter and/or receiver based on the number of detectors associated with a pixel distance (e.g., axis 1202) that is above or below a particular threshold, such as any of the thresholds associated with lines 1208, 1210, 1212, among others.

Figure 13:
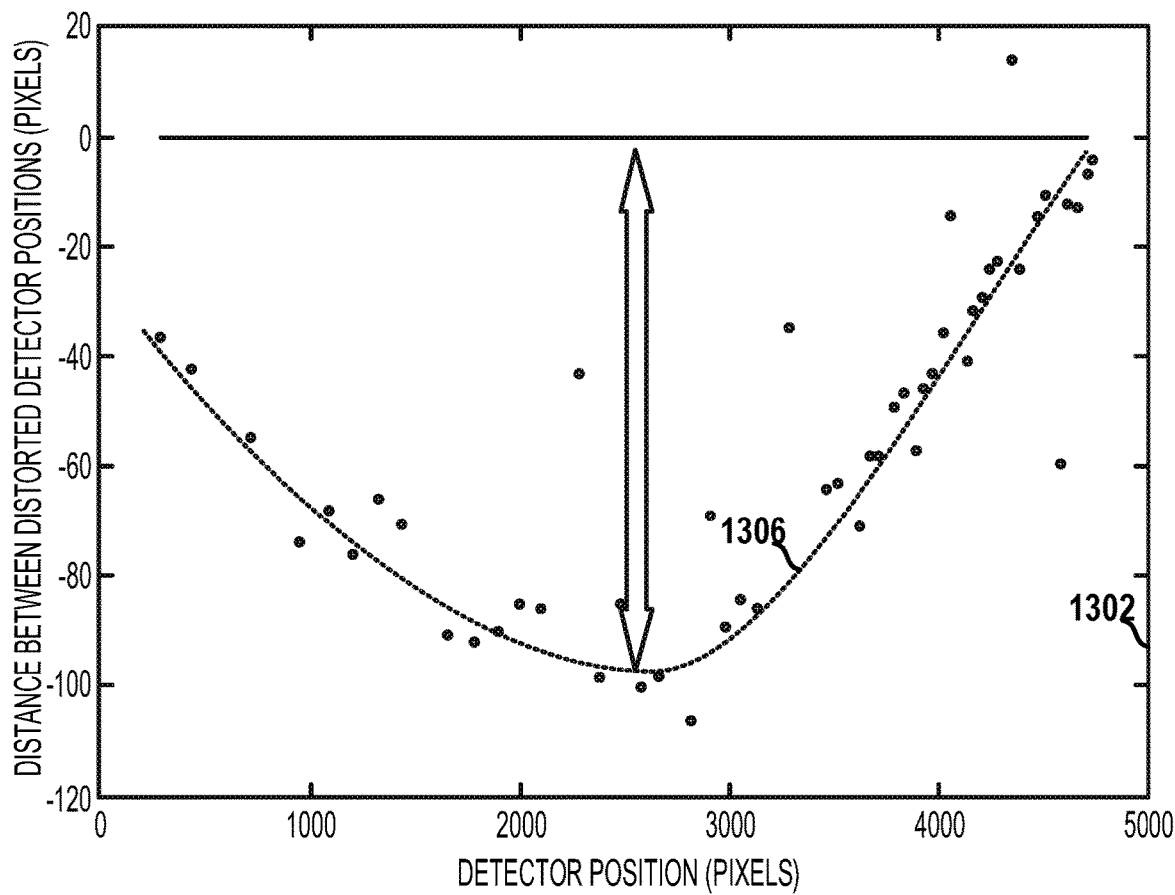
FIG. 13 is a third illustration of alignment offsets determined based on a comparison of a plurality of images, according to an example embodiment.

FIG. 13 illustrates a scenario of such y-axis misalignment, according to an example embodiment. The illustration 1300 of FIG. 13 may be similar to the illustration 1200. However, in FIG. 13, more detectors are associated with negative pixel distances than in the scenario of FIG. 12. Accordingly, an example system may adjust the mounting position in a y-direction of the receiver (e.g., along short side of images 900, 1000) to reduce a y-axis alignment offset (or error) indicated by the illustration 1300.

Additionally, in the scenario of FIG. 13, curve 1306 appears to be skewed toward detectors having higher pixel positions (e.g., near right edge of images 900, 1000) compared to similar detectors indicated by curve 1206 of FIG. 12. Accordingly, this may indicate a yaw misalignment (e.g., a rotation of the receiver about the y-axis) that causes a first (horizontal) end of the receiver to be closer to the camera than an opposite (horizontal) end of the receiver.

As a variation of the scenario above, if vertical axis 1302 of the plot 1300 instead indicates horizontal pixel distances between the first and second detector positions indicated by the images 900 and 1000, then the misalignments shown in FIG. 13 may correspond to a horizontal misalignment (e.g., along x-axis of receiver) between the transmitter and receiver, and a pitch misalignment (e.g., a rotation of the receiver about the x-axis of the receiver).

Figure 14:
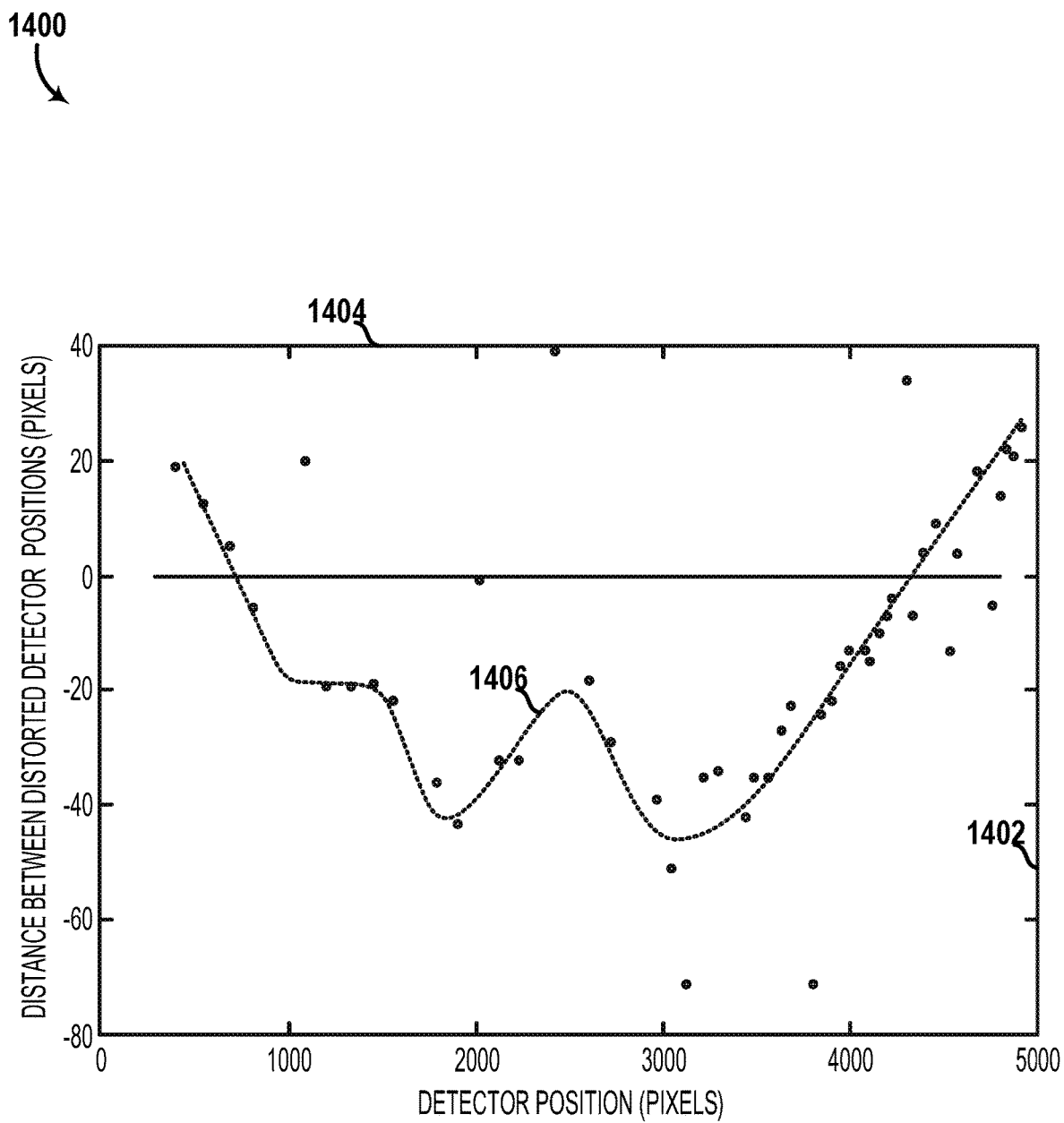
FIG. 14 is a fourth illustration of alignment offsets determined based on a comparison of a plurality of images, according to an example embodiment.

FIG. 14 illustrates a scenario of a roll alignment offset between a LIDAR transmitter and a LIDAR receiver, according to an example embodiment. In an example scenario, the scatter plot in illustration 1400 may be similar to the scatter plots of illustrations 1200 and 1300. For example, vertical axis 1402 may correspond to a pixel distance (e.g., vertical pixel distance) between first and second detector positions indicated by images 900, 100, and horizontal axis 1404 may correspond to horizontal pixel positions of the respective detectors.

As shown in the scenario of FIG. 14, curve 1406 has multiple minimums and a maximum. These offset measurements may indicate that a roll orientation of the receiver 130 (e.g., rotation of the receiver about the z-axis) may be different from a roll orientation of the beams 108a-c defined by the lens 150. For instance, due to the curved shape of focal plane 128, multiple detectors at the same distance from the camera may have the same horizontal position in the images 900 and/or 1000 due to the roll offset of the receiver 130. Thus, an example system may responsively adjust the mounting position of the receiver 130. Other example alignment offset determinations are possible as well.

IV. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   obtaining a plurality of images using a camera located at a given position relative to a light detection and ranging (LIDAR) device, wherein obtaining the plurality of images comprises:
   obtaining a first image while a first aperture is interposed between the camera and the LIDAR device, and
   obtaining a second image while a second aperture is interposed between the camera and the LIDAR device; and
   based on the plurality of images, determining one or more alignment offsets between a transmitter of the LIDAR device and a receiver of the LIDAR device.

2. The method of claim 1, wherein the receiver of the LIDAR device includes one or more light detectors, wherein the first image is indicative of first detector positions for the one or more light detectors, wherein the second image is indicative of second detector positions for the one or more light detectors, the method further comprising:
   comparing the first detector positions to the second detector positions, wherein determining the one or more alignment offsets is based on at least the comparison.

3. The method of claim 2, wherein comparing the first detector positions to the second detector positions comprises:
   comparing locations of one or more image pixels associated with a given light detector in the first image to locations of one or more corresponding image pixels associated with the given light detector in the second image.

4. The method of claim 1, wherein the transmitter includes one or more light sources, wherein obtaining the plurality of images further comprises obtaining a third image while the one or more light sources are emitting light, and wherein the third image is indicative of light source positions of the one or more light sources.

5. The method of claim 4, wherein the receiver of the LIDAR device includes one or more light detectors, wherein the first image is indicative of first detector positions for the one or more light detectors, wherein the second image is indicative of second detector positions for the one or more light detectors, and wherein determining the one or more alignment offsets is based on a comparison of: the first detector positions, the second detector positions, and the light source positions.

6. The method of claim 4, wherein obtaining the third image comprises obtaining the third image while the first aperture is not interposed between the camera and the LIDAR device.

7. The method of claim 4, wherein obtaining the third image comprises obtaining the third image while the second aperture is not interposed between the camera and the LIDAR device.

8. The method of claim 1, wherein the transmitter includes one or more light sources, wherein the receiver includes one or more light detectors, wherein the first image is indicative of detector positions for the one or more light detectors, wherein the second image is indicative of light source positions for the one or more light sources, the method further comprising:
   comparing the detector positions to the light source positions, wherein determining the one or more alignment offsets is based on at least the comparison.

9. The method of claim 1, wherein the transmitter includes one or more light sources, wherein obtaining the first image is while the one or more light sources are not emitting light.

10. The method of claim 9, wherein obtaining the second image is while the one or more light sources are not emitting light.

11. The method of claim 1, further comprising:
    causing an auxiliary light source to illuminate the receiver with illumination light having a source wavelength of light emitted by the transmitter, wherein obtaining the first image is while the receiver is illuminated by the auxiliary light source.

12. The method of claim 11, wherein obtaining the second image is while the receiver is illuminated by the auxiliary light source.

13. The method of claim 1, further comprising:
    causing an actuator to adjust a position of a first window, wherein the first aperture corresponds to a first region of the first window.

14. The method of claim 13, wherein the first region has light transmission characteristics that differ from other light transmission characteristics of other adjacent regions of the first window.

15. The method of claim 13, wherein the first aperture comprises a cavity in the first region of the first window.

16. The method of claim 13, wherein the first window is mounted to a rotatable structure, wherein a second window is also mounted to the rotatable structure, wherein the second window includes a second region that corresponds to the second aperture,
    wherein obtaining the first image comprises causing the actuator to rotate the rotatable structure about an axis to position the first aperture between the camera and the LIDAR device, and
    wherein obtaining the second image comprises causing the actuator to rotate the rotatable structure about the axis to position the second aperture between the camera and the LIDAR device.

17. The method of claim 1, wherein the receiver comprises one or more photodiodes, the method further comprising:
    while obtaining the first image, causing the one or more photodiodes to operate according to a first configuration that causes the one or more photodiodes to emit light; and while obtaining the second image, causing the one or more photodiodes to operate according to a second configuration that causes the one or more photodiodes to provide an output indicative incident light received at the one or more light detectors.

18. The method of claim 1, further comprising providing, via a display, an indication of the one or more determined alignment offsets.

19. The method of claim 1, further comprising:
based on the one or more determined alignment offsets, causing an adjustment of a mounting position of the transmitter or a mounting position of the receiver in the LIDAR device.

20. A system comprising:
a first aperture;
a second aperture;
a camera; and
a controller comprising a processor and data storage, wherein the processer is configured to execute program instructions stored in the data storage to cause the system to perform operations comprising:
obtaining a plurality of images using the camera, wherein obtaining the plurality of images comprises: obtaining a first image while the first aperture is interposed between the camera and a light detection and ranging (LIDAR) device, and obtaining a second image while the second aperture is interposed between the camera and the LIDAR device; and
based on the plurality of images, determining one or more alignment offsets between a transmitter of the LIDAR device and a receiver of the LIDAR device.

* * * * *